(12) United States Patent
Kishi

(10) Patent No.: US 7,558,466 B2
(45) Date of Patent: Jul. 7, 2009

(54) MOVING IMAGE PLAYBACK APPARATUS AND ITS CONTROL METHOD, COMPUTER PROGRAM, AND COMPUTER-READABLE STORAGE MEDIUM

(75) Inventor: Hiroki Kishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 628 days.

(21) Appl. No.: 11/000,228

(22) Filed: Dec. 1, 2004

(65) Prior Publication Data

US 2005/0129387 A1   Jun. 16, 2005

(30) Foreign Application Priority Data

Dec. 8, 2003   (JP) .............................. 2003-409359
Mar. 2, 2004   (JP) .............................. 2004-057631

(51) Int. Cl.
*H04N 5/91* (2006.01)
*H04N 7/26* (2006.01)

(52) U.S. Cl. .............................. 386/68; 386/83; 386/109

(58) Field of Classification Search .................. 386/68, 386/83, 109; 348/143, 169
See application file for complete search history.

(56) References Cited

U.S. PATENT DOCUMENTS

| 5,734,783 | A  | * | 3/1998 | Shimoda et al. ................ 386/68 |
| 6,757,008 | B1 | * | 6/2004 | Smith .......................... 348/143 |
| 2003/0164877 | A1 | * | 9/2003 | Murai .......................... 348/143 |
| 2004/0057514 | A1 |   | 3/2004 | Kishi ...................... 375/240.01 |

FOREIGN PATENT DOCUMENTS

JP   8-163494   6/1996
WO   WO 02/104034 A1 * 12/2002

* cited by examiner

*Primary Examiner*—Thai Tran
*Assistant Examiner*—Hung Q Dang
(74) *Attorney, Agent, or Firm*—Fitzpatrick, Cella, Harper & Scinto

(57) ABSTRACT

According to this invention, since a region to be decoded in a frame is set in accordance with the playback speed, the load on the decoding process remains unchanged irrespective of the playback speed, and a smooth moving image can be played back within a feasible load range. To this end, when normal playback is designated, a frame data decoding unit is set to decode the entire frame at 30 fps. On the other hand, when double-speed playback is designated by a high-speed playback designation, the frame data decoding unit is set to decode a region substantially corresponding to ½ the area of a frame at 60 fps.

9 Claims, 38 Drawing Sheets

FIG. 10A

| LL | HL |
|----|----|
| LH | HH |

FIG. 10B

| LL | HL | HL |
|----|----|----|
| LH | HH |    |
| LH |    | HH |

FIG. 10C

| LL | HL1 | HL2 | HL3 |
| LH1 | HH1 |  |  |
| LH2 |  | HH2 |  |
| LH3 |  |  | HH3 |

FIG. 11

| FREQUENCY COMPONENT | QUANTIZATION STEP |
|---|---|
| LL | 1 |
| HL1 | 2 |
| HH1 | 2 |
| LH1 | 2 |
| HL2 | 4 |
| HH2 | 4 |
| LH2 | 4 |
| HL3 | 8 |
| HH3 | 8 |
| LH3 | 8 |

F I G. 12
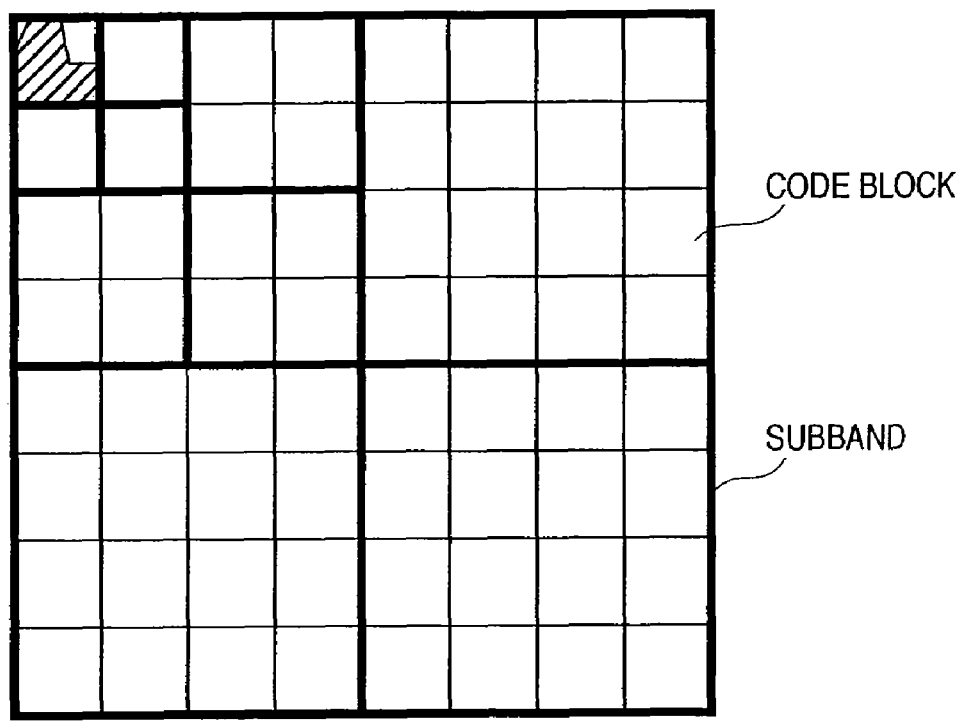

FIG. 17

| TILE HEADER | LAYER 0 | LAYER 1 | LAYER 2 | LAYER 3 | LAYER 4 |
|---|---|---|---|---|---|

DISPLAY REGION DOES NOT CONTACT CODE BLOCK BOUNDARY

SOLID LINE : TILE BOUNDARY,
BROKEN LINE : CODE BLOCK BOUNDARY

SOLID LINE : TILE BOUNDARY,
BROKEN LINE : CODE BLOCK BOUNDARY

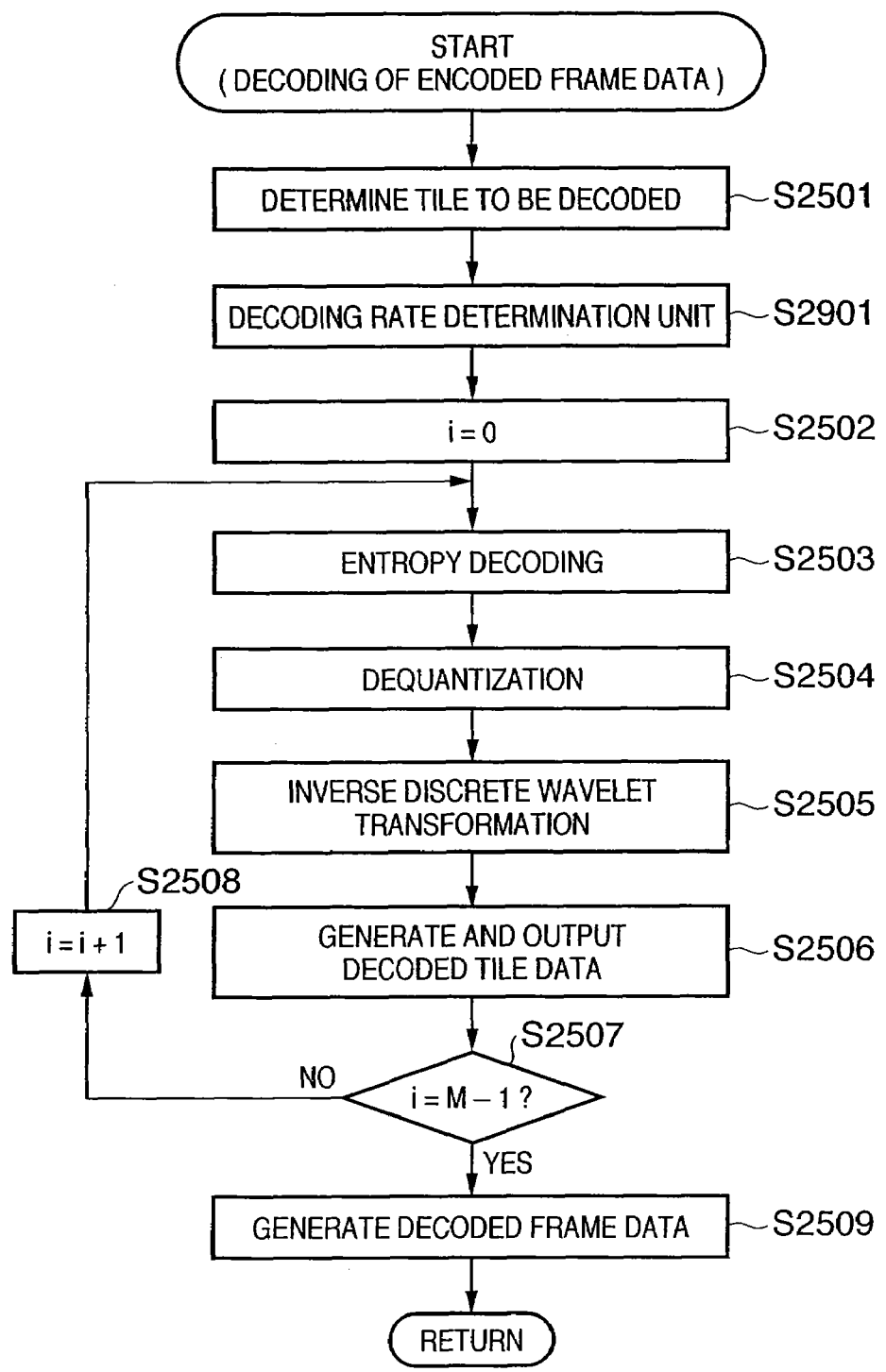
F I G. 32

MOVING IMAGE PLAYBACK APPARATUS AND ITS CONTROL METHOD, COMPUTER PROGRAM, AND COMPUTER-READABLE STORAGE MEDIUM

FIELD OF THE INVENTION

The present invention relates to a playback technique of digital moving image data.

BACKGROUND OF THE INVENTION

Moving image encoding schemes such as MotionJPEG, MPEG, and the like have been established. Vendors have developed, using these encoding schemes, image sensing apparatuses such as digital still cameras, digital video cameras, and the like, moving image viewers, and DVD recorders, which have been put into practical use, and a personal computer (to be referred to as a PC hereinafter) and DVD player allow easy playback.

JPEG2000 has been standardized as an encoding scheme recently. One of the specifications of JPEG2000 is Motion-JPEG2000 that can handle a high-resolution moving image, and has received a lot of attention as the next generation moving image compression encoding scheme (for example, ISO/IEC-15444-3: JPEG2000 standard part-3, etc.).

Nowadays, moving images are handled in various forms by the aforementioned apparatuses. A moving image is recorded as an analog signal or digital data in some cases. When a moving image is an analog signal, an NTSC monitor is often used to display a playback image. On the other hand, when a moving image is digital data, its playback image is often displayed on a display having a plurality of vertical display frequencies such as a display connected to a PC.

As a moving image playback method, high-speed playback that starts playback after a desired image is found is known. As a method of playing back and displaying an analog moving image signal on an NTSC monitor at high speed, a method of making a magnetic tape as a recording medium travel at high speed, and simultaneously displaying a plurality of pieces of video information with a time difference, which are played back from a plurality of recording tracks, is available. Also, as a method of playing back and displaying digital moving image data at high speed, a method of making playback while skipping frames at predetermined intervals is known. Furthermore, a method of dividing each frame that forms digital moving image data, compositing one frame for a plurality of frames as a high-speed playback image, and playing back and displaying that image at high speed like an analog moving image is known (e.g., Japanese Patent Laid-Open No. 8-163494).

On the other hand, as users have more chances to handle moving images, their requirements are increasing. To meet such requirements, vendors provide various value-added products.

For example, the vendors of digital still cameras and digital video camera add a liquid crystal display that allows the user to confirm a video picture sensed by himself or herself at that place. A video picture displayed on this display includes not only a normal playback image but also a special playback image, enlarged/reduced-scale image, and the like. For this reason, the user can appreciate the sensed video pictures by various methods, and can sufficiently enjoy acquired video pictures even on a digital still camera or camcorder.

A moving image is often played back at high speed. For example, double-speed playback will be examined below. In this case, two different types of processes may be used.

In one process, if the normal playback speed is 30 fps (frames/sec), a moving image is played back at 60 fps in the double-speed playback mode. In the other process, only one of two frames is played back.

In the former process, the load on a decoding process substantially becomes twice that for a normal speed. In case of hardware implementation, a high-speed clock signal or a large circuit scale is required, and power consumption increases. In case of software implementation, a CPU which can sufficiently follow that speed is required. In the latter process, since frames are decimated, a moving image is played back awkwardly.

SUMMARY OF THE INVENTION

The present invention has been made in consideration of the aforementioned problems, and has as its object to provide a technique that can smoothly play back a moving image within the range of a function of performing playback at a normal playback speed as long as such function is available.

In order to achieve this object, a moving image playback apparatus according to the present invention comprises the following arrangement. That is, a moving image playback apparatus for playing back a compression-encoded moving image, comprises:

decoding means for decoding a desired region of a frame of encoded moving image data;

display output means for displaying and outputting an image obtained by decoding;

first setting means for setting a playback speed of a moving image; and second setting means for determining a region in a frame to be played back in accordance with the playback speed set by said first setting means, and setting information associated with the determined region in said decoding means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 10A to 10C are exploded views of subbands in respective wavelet transformation processes;

FIG. 11 shows a table of quantization steps;

FIG. 12 is an explanatory view of code block segmentation;

FIG. 17 is an explanatory view of the format of encoded tile data;

FIG. 32 is a flowchart of a moving image data encoding process to be executed by a moving image playback apparatus according to the sixth embodiment of the present invention;

DETAILED DESCRIPTION OF THE PREFERRED EMBODIMENTS

Preferred embodiments of the present invention will be described in detail hereinafter with reference to accompanying drawings.

First Embodiment

Figure 1:
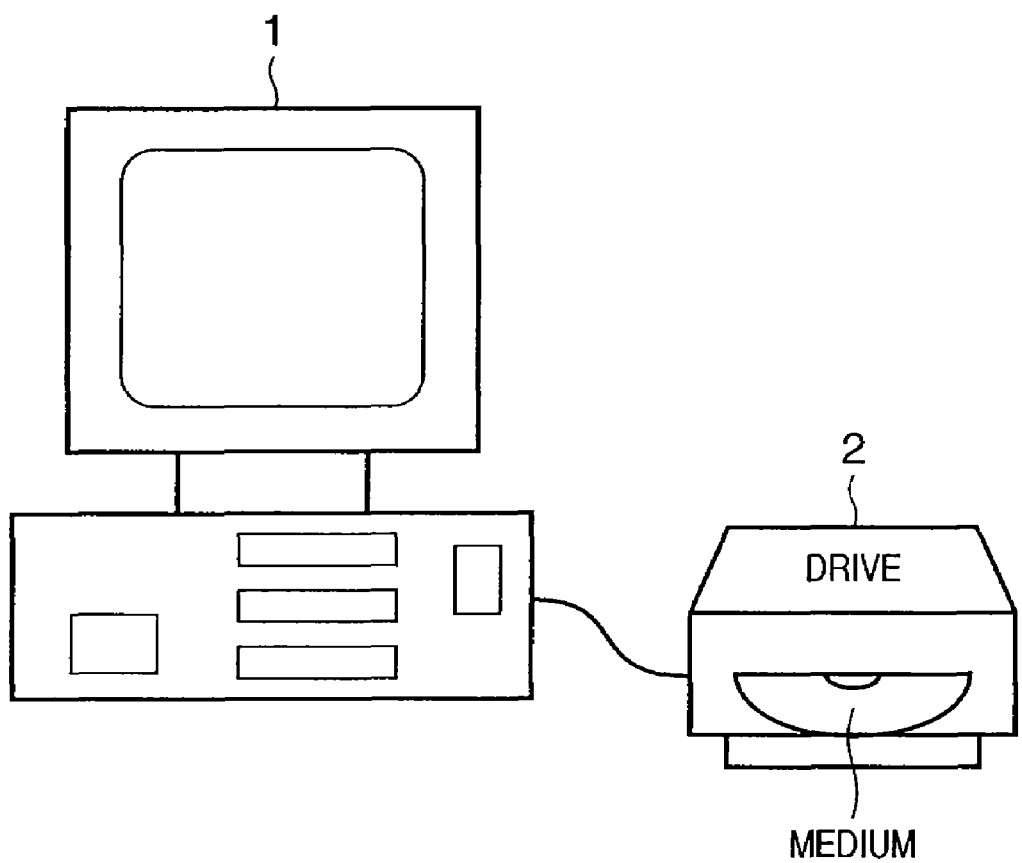
FIG. 1 is a schematic outside view showing one example of a system in which a moving image playback apparatus of the present invention is used.

FIG. 1 is a schematic view showing an example of a playback system in which a moving image playback apparatus of the present invention is used. Reference numeral 1 denotes a general-purpose information processing apparatus such as a personal computer or the like (to be referred to as "PC" hereinafter); and 2, a drive that reads out data from a storage medium such as a DVD-ROM or the like. In the first embodiment, the PC 1 reads out and decodes encoded moving image data recorded on an internal HDD or a medium such as a DVD-ROM or the like, and displays a playback image on a display. A case will be explained below wherein the PC 1 in the first embodiment has processing performance that can decode all encoded data of an image with a predetermined size at a maximum of 30 fps (frames/sec). The display frequency (vertical sync signal frequency) of the display is 60 Hz or higher, and is a general one. Furthermore, the playback system of the first embodiment performs normal playback at 30 fps.

When the playback system performs double-speed playback, double-speed playback cannot be implemented by decoding all encoded frame data at 60 fps due to the processing performance of the PC 1. On the other hand, double-speed playback can be implemented by selecting encoded frame data while skipping every other frames and decoding the selected frames (every other frames) at 30 fps in terms of the processing performance of the PC 1. However, with this playback method, an unnatural moving image is played back due to skipping.

Hence, in this embodiment, in order to allow the PC 1 to display a smooth playback image, data corresponding to an area ½ of each image is decoded to substantially attain 60 fps in the double-speed playback mode.

By reducing a display region, the region of interest (ROI) of the user may fall outside the display region. In consideration of such situation, this embodiment allows the user to freely move the display region. This method will be described below.

A moving image encoding device which generates encoded moving image data that allows this embodiment to be practiced will be explained first, and a moving image playback apparatus according to this embodiment will then be explained. In the following description, since the playback method of audio data falls outside the gist of the present invention, details of an audio encoding method and playback method will be omitted in this specification.

Moving Image Encoding Device

Figure 2:
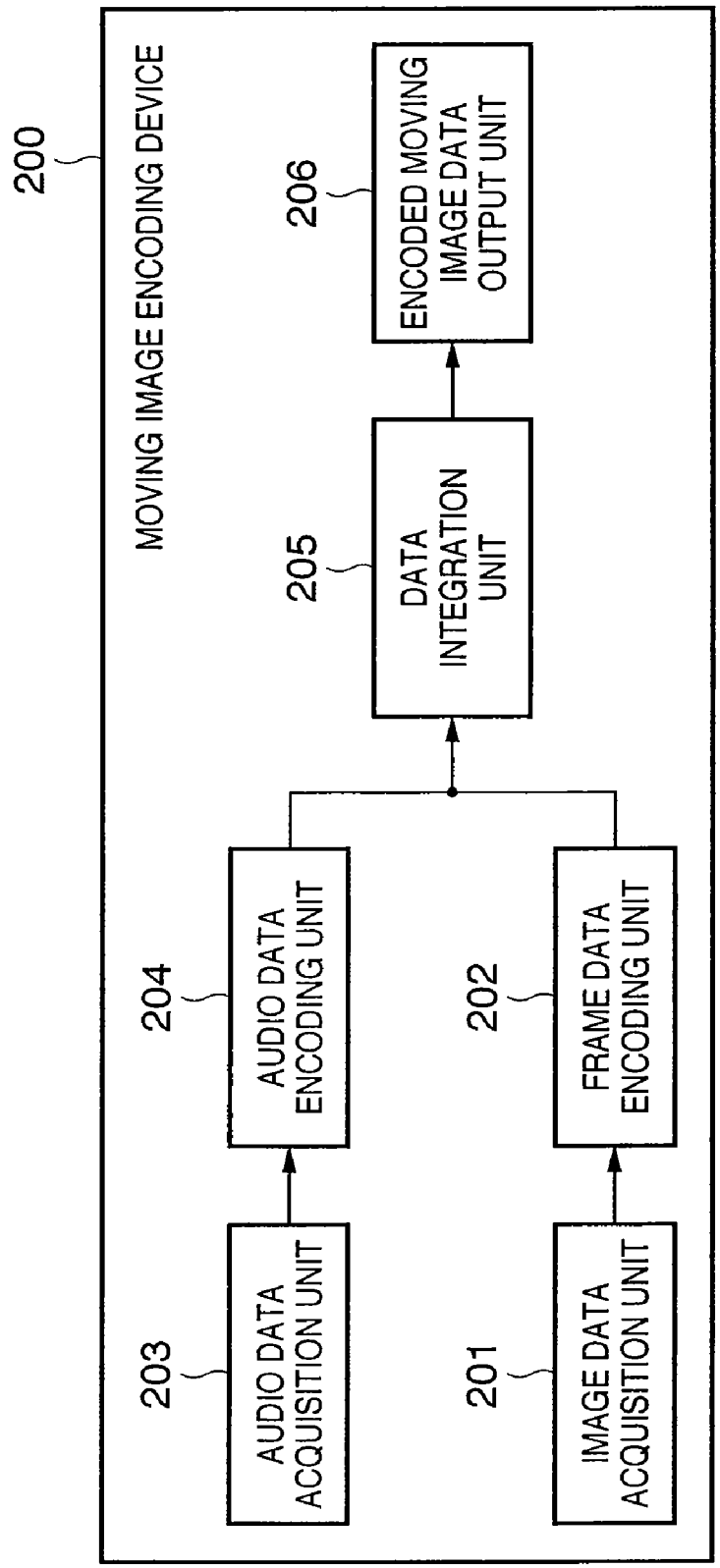
FIG. 2 is a schematic block diagram showing the arrangement of a moving image encoding device according to the first embodiment of the present invention.
Figure 3:
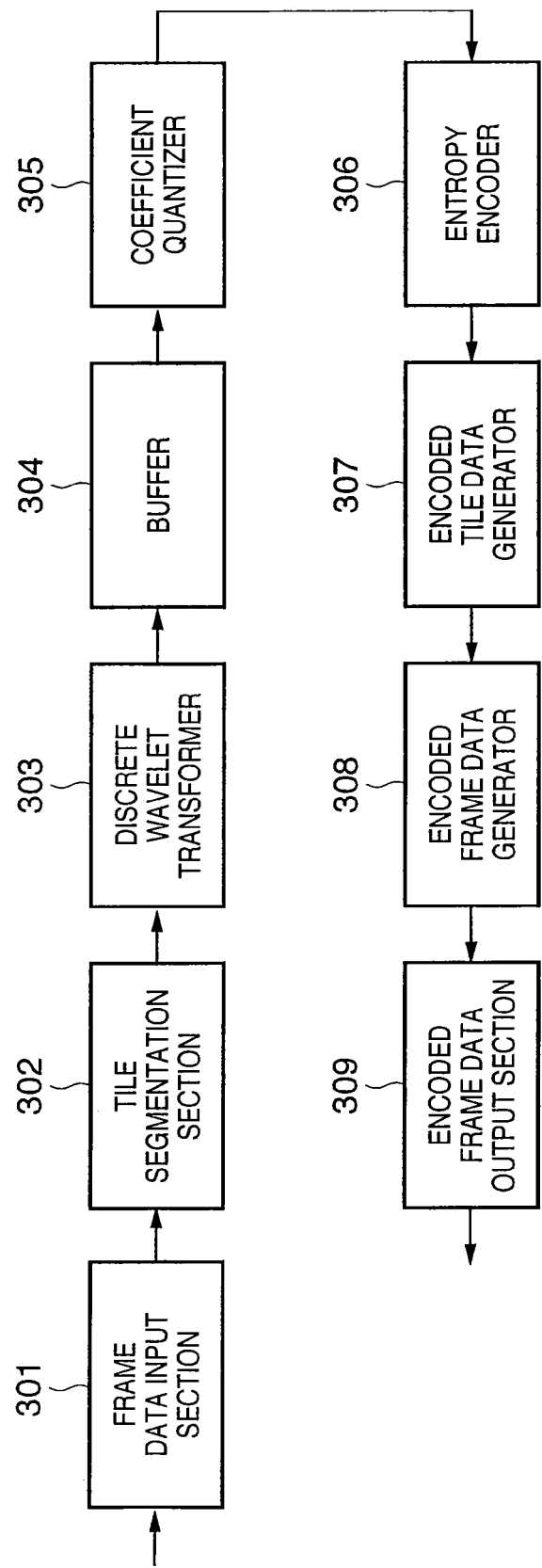
FIG. 3 is a schematic block diagram showing the arrangement of a frame data encoding unit according to the first embodiment of the present invention.
Figure 4:
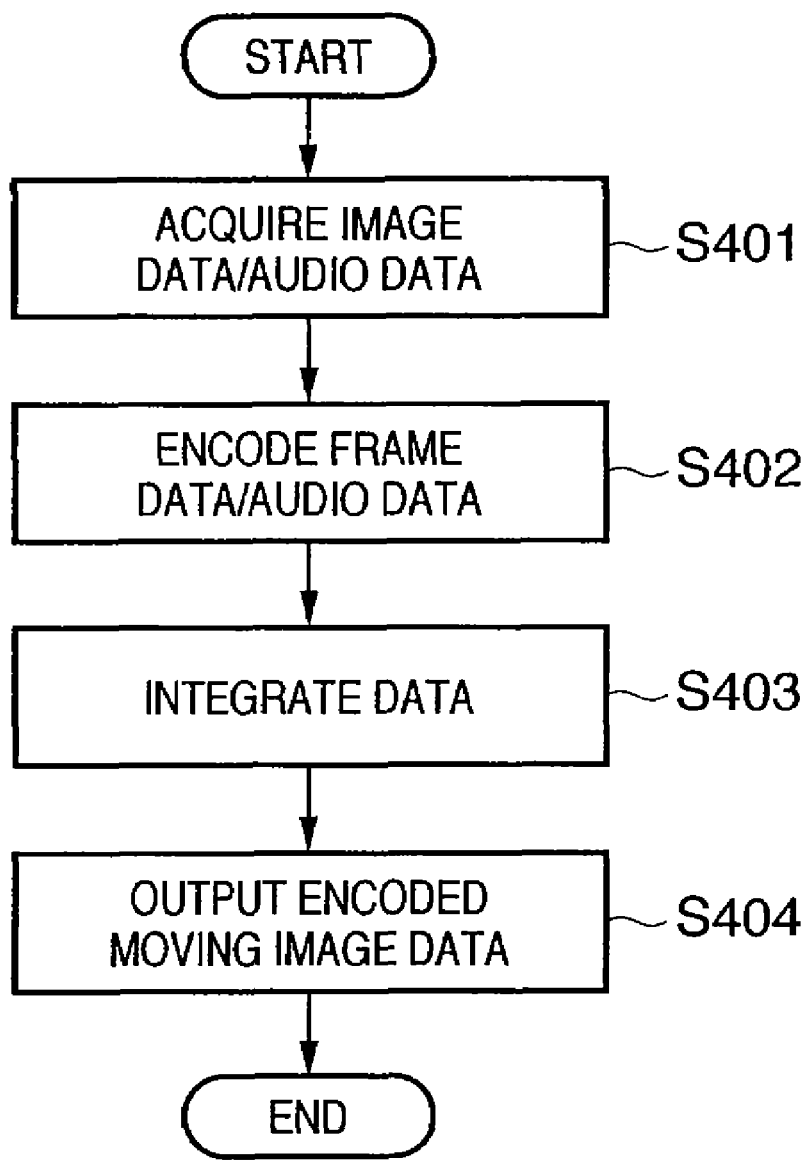
FIG. 4 is a flowchart of a moving image data encoding process to be executed by the moving image encoding device according to the first embodiment of the present invention.

FIG. 2 is a block diagram showing the arrangement of a moving image encoding device 200 of this embodiment, and FIG. 3 shows the arrangement of a frame data encoding unit shown in FIG. 2. FIG. 4 is a flowchart of the process of the moving image encoding device 200. Respective building components will be explained below together with their operation processing contents.

Figure 5:
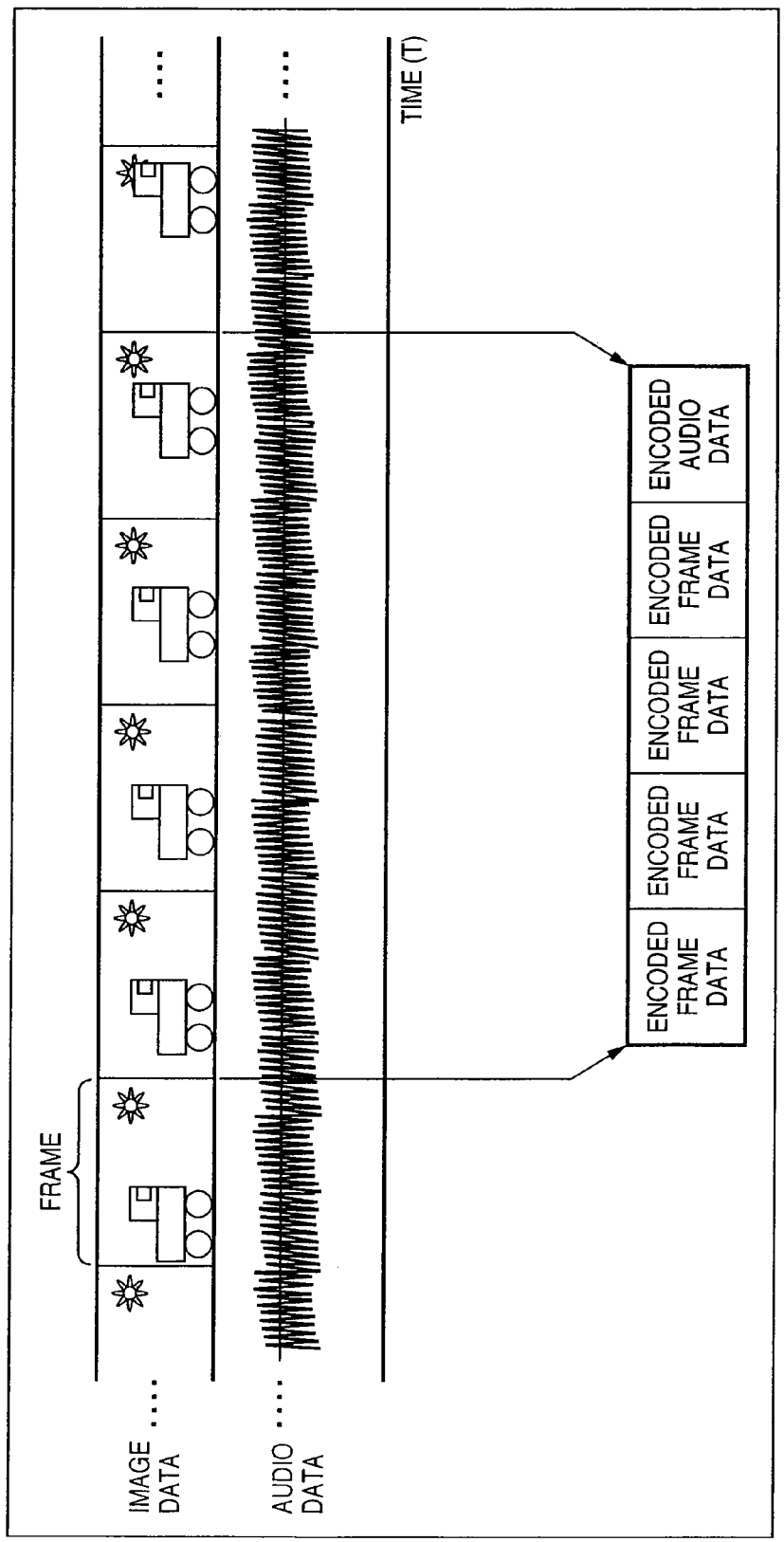
FIG. 5 is an explanatory view of the format of encoded moving image data.

Image data and audio data are input from an image data acquisition unit 201 and audio data acquisition unit 203 (step S401). As the image data acquisition unit 201 and audio data acquisition unit 203, for example, an image sensing apparatus such as a digital video camera, digital still camera, scanner, or the like, an image sensing device such as a CCD or the like, a network interface, or the like is used. Furthermore, a recording medium such as a RAM, ROM, hard disk, CD-ROM, or the like may be used as the image data acquisition unit 201 and audio data acquisition unit 203. FIG. 5 shows the concept of image data and audio data acquired from the image data acquisition unit 201 and audio data acquisition unit 203 along with an elapse of time.

In step S402, image data acquired from the image data acquisition unit 201 is input to a frame data encoding unit 202 for respective frame data (for respective frames shown in FIG. 5). Each frame data input to the frame data encoding unit 202 undergoes a compression process to generate encoded frame data. A plurality of generated encoded frame data are sequentially input to a data integration unit 205.

On the other hand, audio data acquired from the audio data acquisition unit 203 is input to an audio data encoding unit 204, and is encoded by a process to be described later to generate encoded audio data (step S402).

The generated encoded audio data is input to the data integration unit 205. Although the encoding method of audio data will not be described below, for example, MP3 (MPEG Audio Layer III), AAC (Advance Audio Coding), and the like are available as the encoding method of audio data. However, the present invention is not limited to such specific methods. Also, encoding may be skipped.

Figure 6:
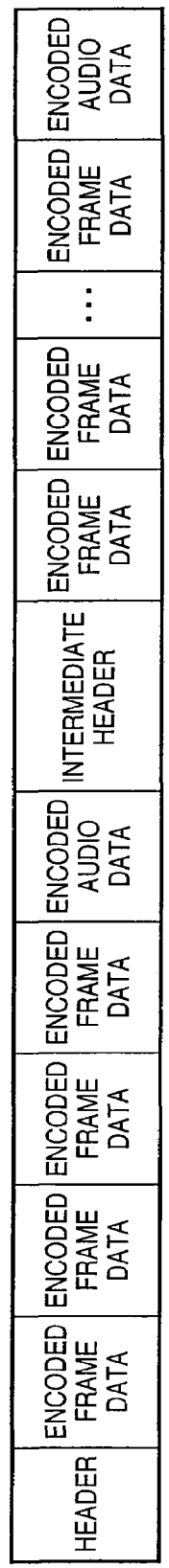
FIG. 6 is an explanatory view of the format of encoded moving image data.

After the encoded audio data and encoded frame data are input to the data integration unit 205, the encoded frame data and encoded audio data are arranged on the basis of a predetermined rule, as shown in FIG. 5. In the example shown in FIG. 5, after encoded frame data for four frames, encoded audio data corresponding to these frames is inserted. Furthermore, data such as a header and the like required for decoding is inserted at a predetermined position, as shown in FIG. 6, thereby generating encoded moving image data (step S403).

After that, the generated encoded moving image data is externally output from an encoded moving image data output unit 206 (step S404). As the encoded moving image data output unit 206, for example, an interface of a public telephone line, a wireless line such as Bluetooth or the like, or a wired line such as a LAN, USB, IEEE1394, or the like may be used. When the moving image encoding device 200 is arranged in another apparatus such as the PC 1 or the like, the unit 206 may be an interface that outputs the encoded moving image data to the internal memory of that apparatus.

Figure 7:
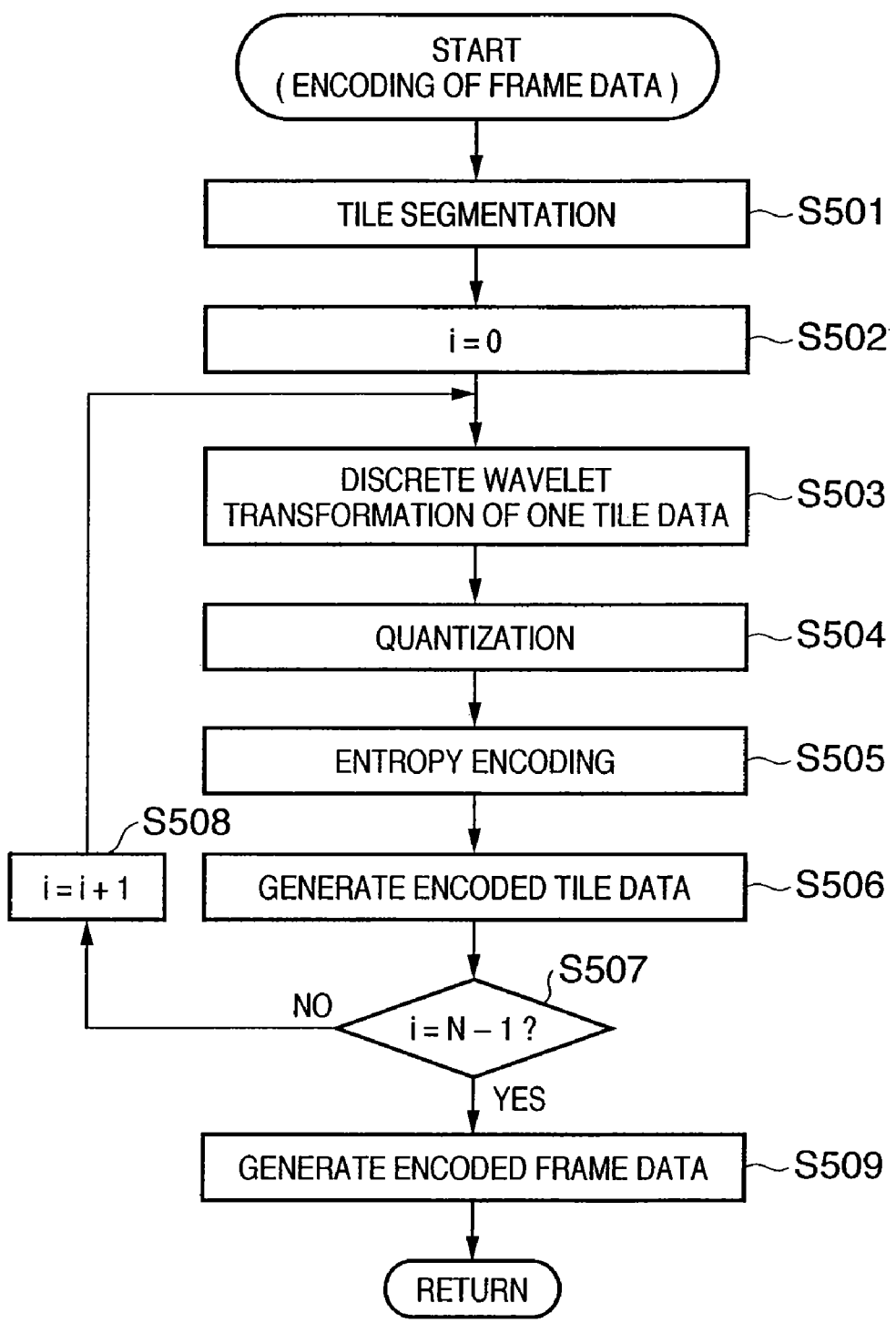
FIG. 7 is a flowchart of a frame data encoding process to be executed by the frame data encoding unit according to the first embodiment of the present invention.

The frame data encoding process in the frame data encoding unit 202 will be described below with reference to the arrangement of the frame data encoding unit 202 shown in FIG. 3 and the flowchart of FIG. 7.

In the following description, assume that frame data to be encoded is 8-bit monochrome frame data. However, the present invention is not limited to such specific frame data. For example, the present invention can be applied to a monochrome image which is expressed by the number of bits other than 8 bits (e.g., 4 bits, 10 bits, or 12 bits per pixel), or multi-valued color frame data which expresses each color component (RGB/Lab/YCrCb) of each pixel by 8 bits. Also, the present invention can be applied to multi-valued information which represents the states and the like of each pixel that forms an image, or a multi-valued index value which represents the color of each pixel. In these applications, each kind of multi-valued information can be considered as monochrome frame data.

Frame data of an image to be encoded are input from the image data acquisition unit 201 to a frame data input section 301 in a raster scan order, and are then output to a tile segmentation section 302.

Figure 8:
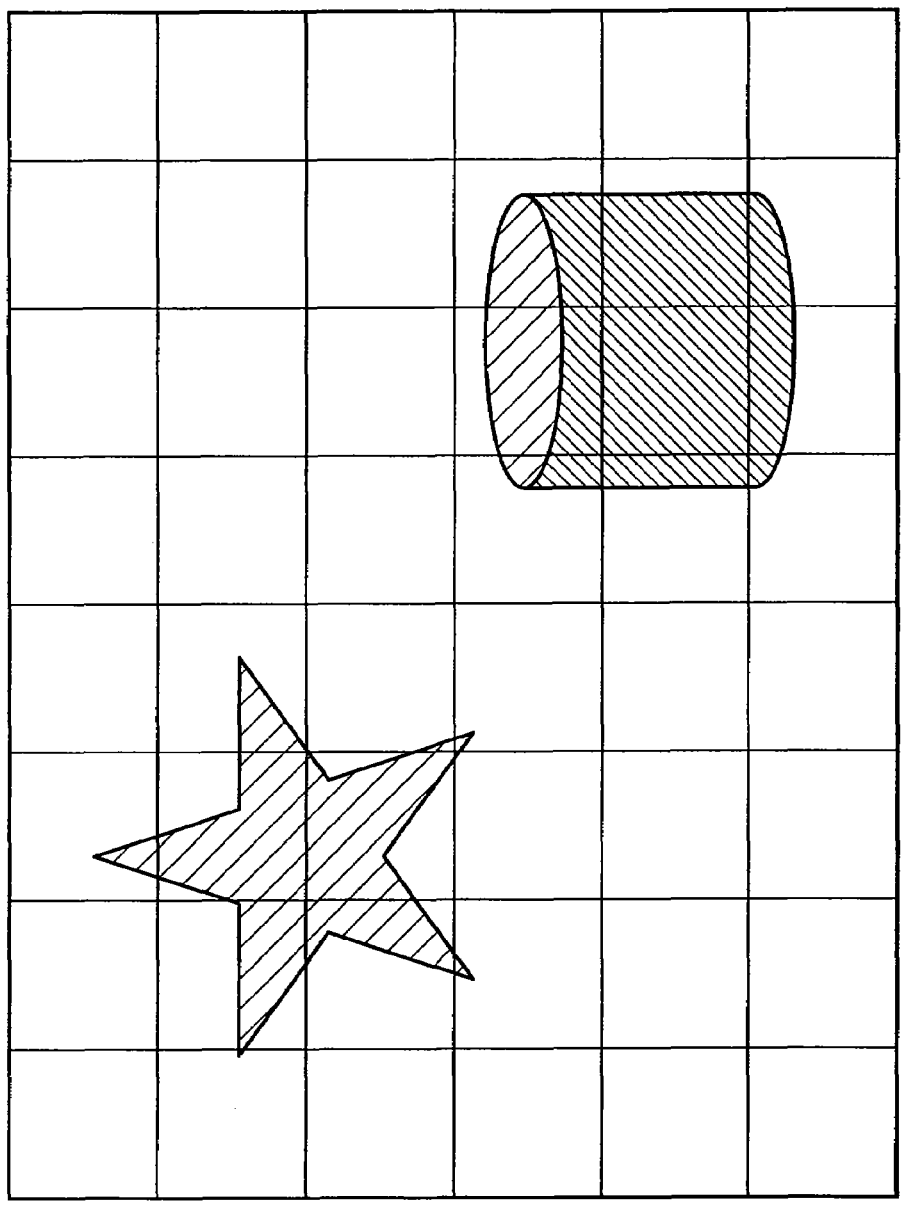
FIG. 8 is an explanatory view of tile segmentation.

The tile segmentation section 302 segments one image input from the frame data input section 301 into N tiles, as shown in FIG. 8 (step S501), and assigns tile numbers 0, 1, 2, ..., N-1 in a raster scan order in the first embodiment so as to identify respective tiles. Data that represents each tile will be referred to as tile data hereinafter. FIG. 8 shows an example in which an image is broken up into 48 tiles (=8 (horizontal)×6 (vertical)), but the number of segmented tiles can be changed as needed. These generated tile data are sent in turn to a discrete wavelet transformer 303. In the processes of the discrete wavelet transformer 303 and subsequent sections, encoding is done for each tile data.

In step S502, a counter used to recognize a tile to be processed by the frame data encoding unit 202 is set to i=0.

The discrete wavelet transformer 303 computes the discrete wavelet transforms using data of a plurality of pixels (reference pixels) (to be referred to as "reference pixel data" hereinafter) for each tile data in frame data of one frame image, which is input from the tile segmentation section 302 (step S503).

Figure 9:
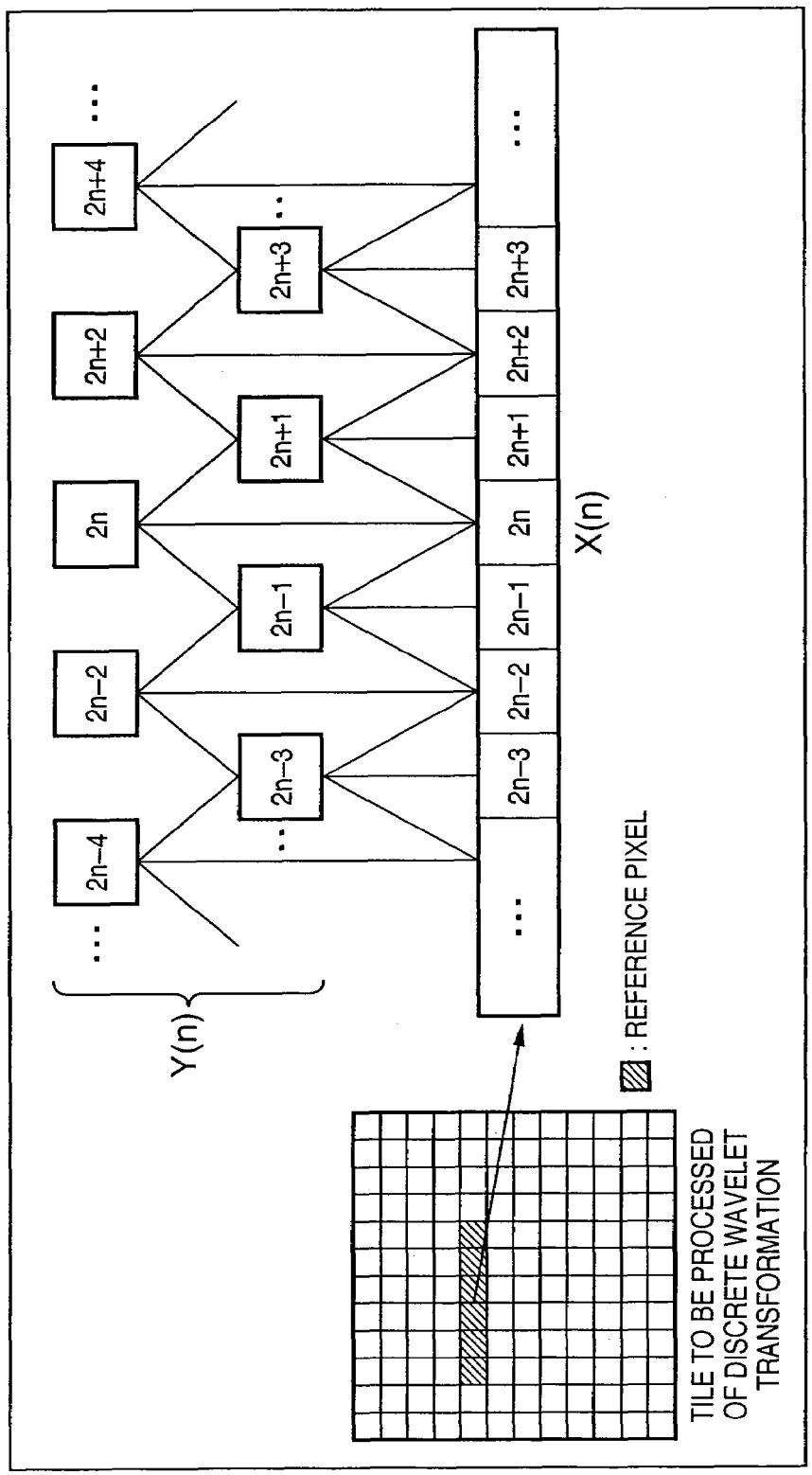
FIG. 9 is an explanatory view of linear discrete wavelet transformation.

Note that frame data after discrete wavelet transformation (discrete wavelet transformation coefficients) is given by:

$$Y(2n)=X(2n)+\text{floor}\{(Y(2n-1)+Y(2n+1)+2)/4\}$$

$$Y(2n+1)=X(2n+1)-\text{floor}\{(X(2n)+X(2n+2))/2\} \qquad (1)$$

where $Y(2n)$ and $Y(2n+1)$ are discrete wavelet transformation coefficient sequences; $Y(2n)$ indicates a low-frequency subband, and $Y(2n+1)$ indicates a high-frequency subband. Also, floor$\{X\}$ in transformation formulas (1) indicates a maximum integer which does not exceed X. FIG. 9 illustrates this discrete wavelet transformation process.

Transformation formulas (1) correspond to one-dimensional data. When two-dimensional transformation is attained by applying this transformation in turn in the horizontal and vertical directions, data can be broken up into four subbands LL, HL, LH, and HH, as shown in FIG. 10A. Note that L indicates a low-frequency subband, and H indicates a high-frequency subband. Then, the LL subband is similarly broken up into four subbands (FIG. 10B), and an LL subband of these subbands is further broken up into four subbands (FIG. 10C). In this way, a total of 10 subbands are generated. The 10 subbands are respectively named HH1, HL1, ..., as shown in FIG. 10C. A suffix in each subband name indicates the level of a subband. That is, the subbands of level 1 are HL1, HH1, and LH1, those of level 2 are HL2, HH2, and LH2, and those of level 3 are HL3, HH3, and LH3. Note that the LL subband is a subband of level 0. Since there is only one LL subband, no suffix is appended. A decoded image obtained by decoding subbands from level 0 to level n will be referred to as a decoded image of level n hereinafter. The decoded image has higher resolution with increasing level. Note that FIG. 10C exemplifies wavelet transformation which is executed tree times, but the number of times of wavelet transformation is not limited.

The transformation coefficients of the 10 subbands are temporarily stored in a buffer 304, and are output to a coefficient quantizer 305 in the order of LL, HL1, LH1, HH1, HL2, LH2, HH2, HL3, LH3, and HH3, i.e., in turn from a subband of lower level to that of higher level.

The coefficient quantizer 305 quantizes the transformation coefficients of the subbands output from the buffer 304 by quantization steps which are determined for respective frequency components, and outputs quantized values (coefficient quantized values) to an entropy encoder 306 (step S504). Let X be a coefficient value, and q be a quantization step value corresponding to a frequency component to which this coefficient belongs. Then, quantized coefficient value Q(X) is given by:

$$Q(X)=\text{floor}\{(X/q)+0.5\} \qquad (2)$$

FIG. 11 shows the correspondence table between frequency components and quantization steps in the first embodiment. As shown in FIG. 11, a larger quantization step is given to a subband of higher level. Note that the quantization steps for respective subbands are stored in advance in a memory such as a RAM, ROM, or the like (not shown). After all transformation coefficients in one subband are quantized, these coefficient quantized values are output to the entropy encoder 306.

Figure 13:
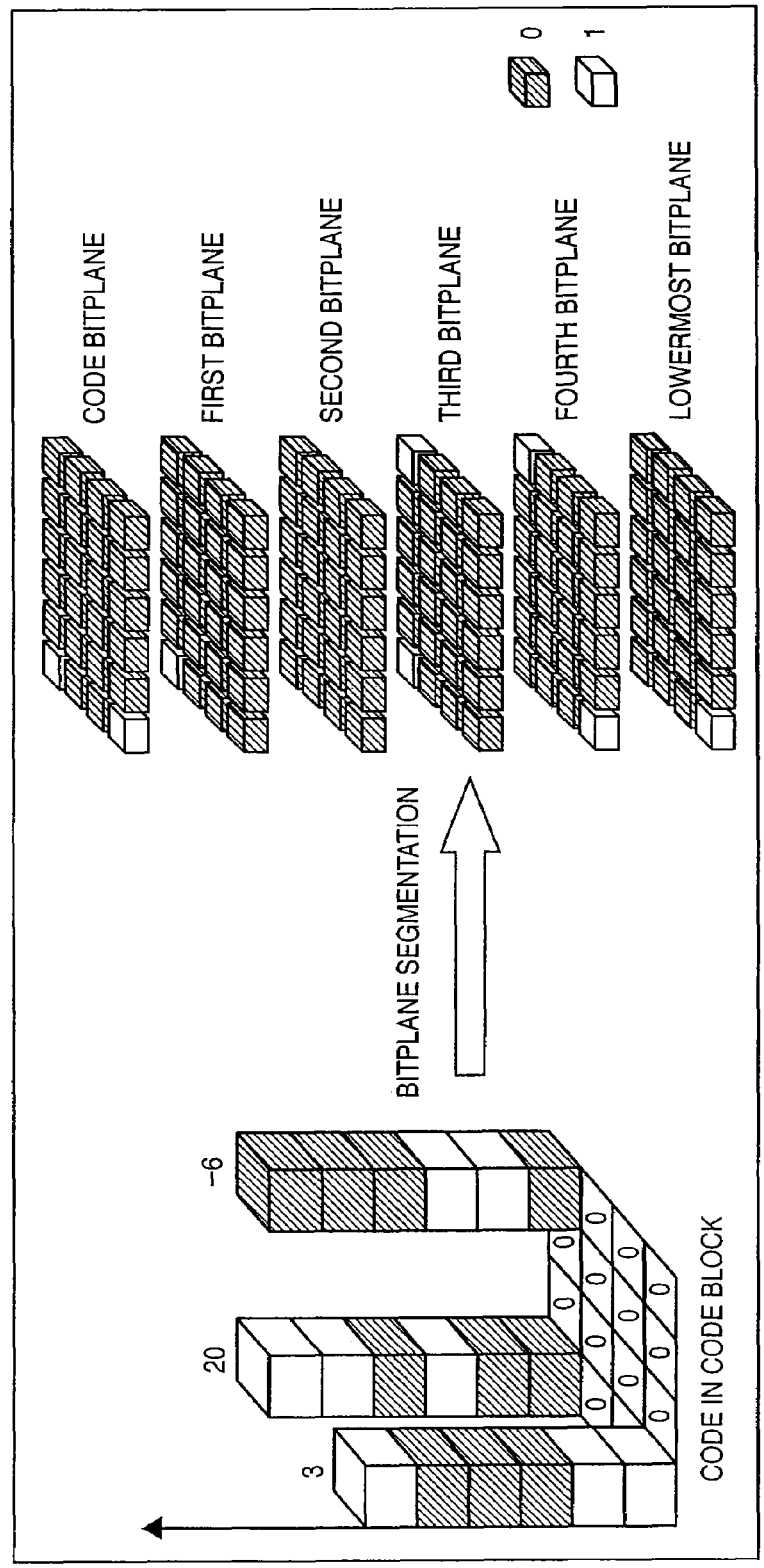
FIG. 13 is an explanatory view of bitplane segmentation.
Figure 14:
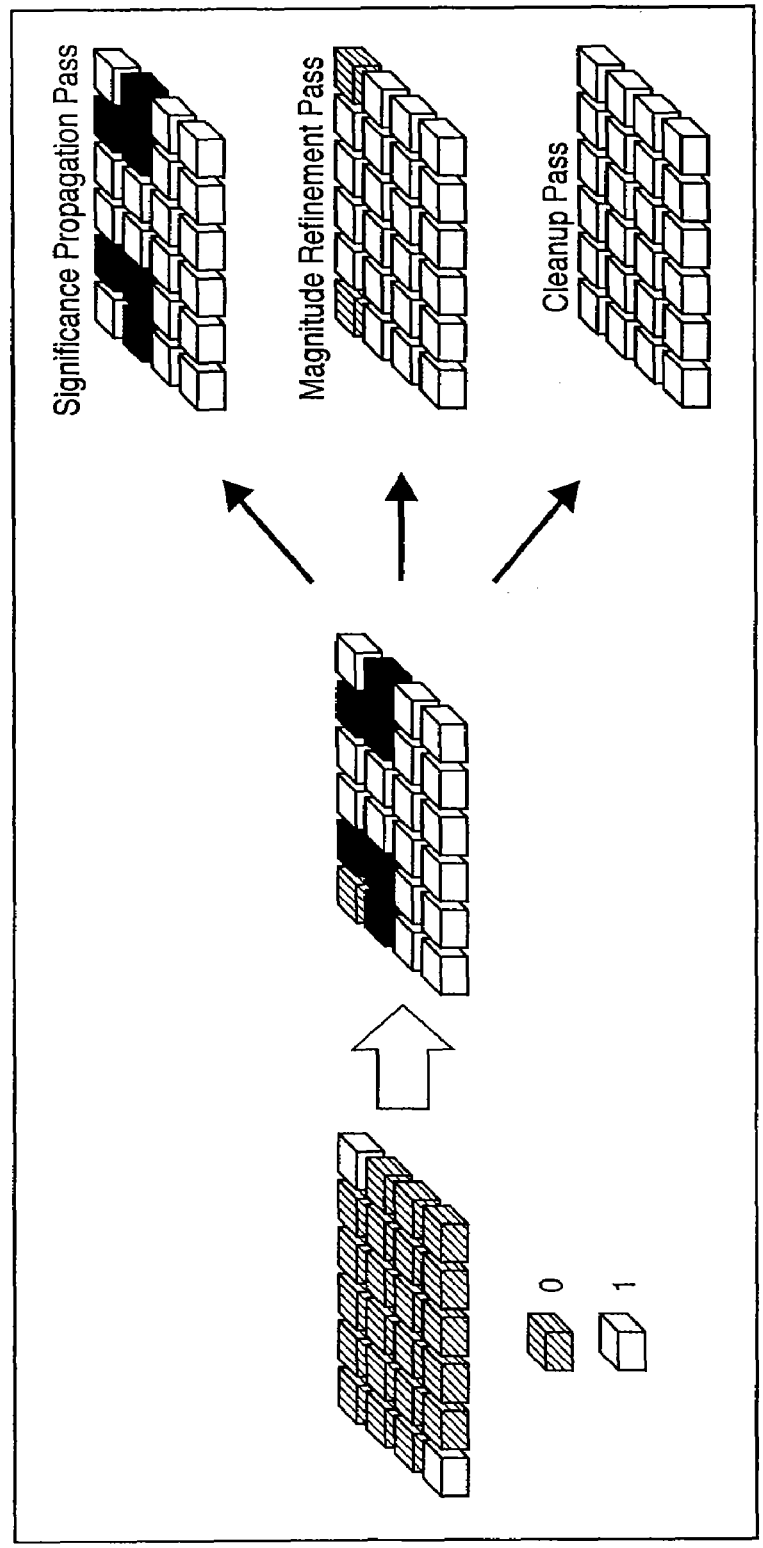
FIG. 14 is an explanatory view of coding passes.

The entropy encoder 306 entropy-encodes the input coefficient quantized values (step S505). In this process, each subband as a set of the input coefficient quantized values is segmented into blocks (to be referred to as "code blocks" hereinafter), as shown in FIG. 12. Note that the code block is set to have a size of 2 m×2n (m and n are integers equal to or larger than 2) or the like. Since each individual coefficient in one code block is expressed by a plurality of bits, the first significant bit position is obtained from the MSB of all coefficients upon focusing attention on one code block, and a bitplane formed by bits at that bit position of respective coefficients is generated. Then, bitplanes at lower bit positions are similarly generated. That is, the code block is broken up into bitplanes, as shown in FIG. 13. Bits on the respective bitplanes are categorized into three groups on the basis of predetermined categorizing rules to generate three different coding passes as sets of bits of identical types, as shown in FIG. 14. The input coefficient quantized values undergo binary arithmetic encoding as entropy encoding using the obtained coding passes as units, thereby generating entropy encoded values.

Note that entropy encoding of one code block is done in the order from upper to lower bitplanes, and a given bitplane of that code block is encoded in turn from the upper one of the three different passes shown in FIG. 14.

The entropy-encoded coding passes are output to an encoded tile data generator 307.

The encoded tile data generator 307 forms one or a plurality of layers based on the plurality of input coding passes, and generates encoded tile data using these layers as a data unit (step S506). The format of layers will be described below.

Figure 15:
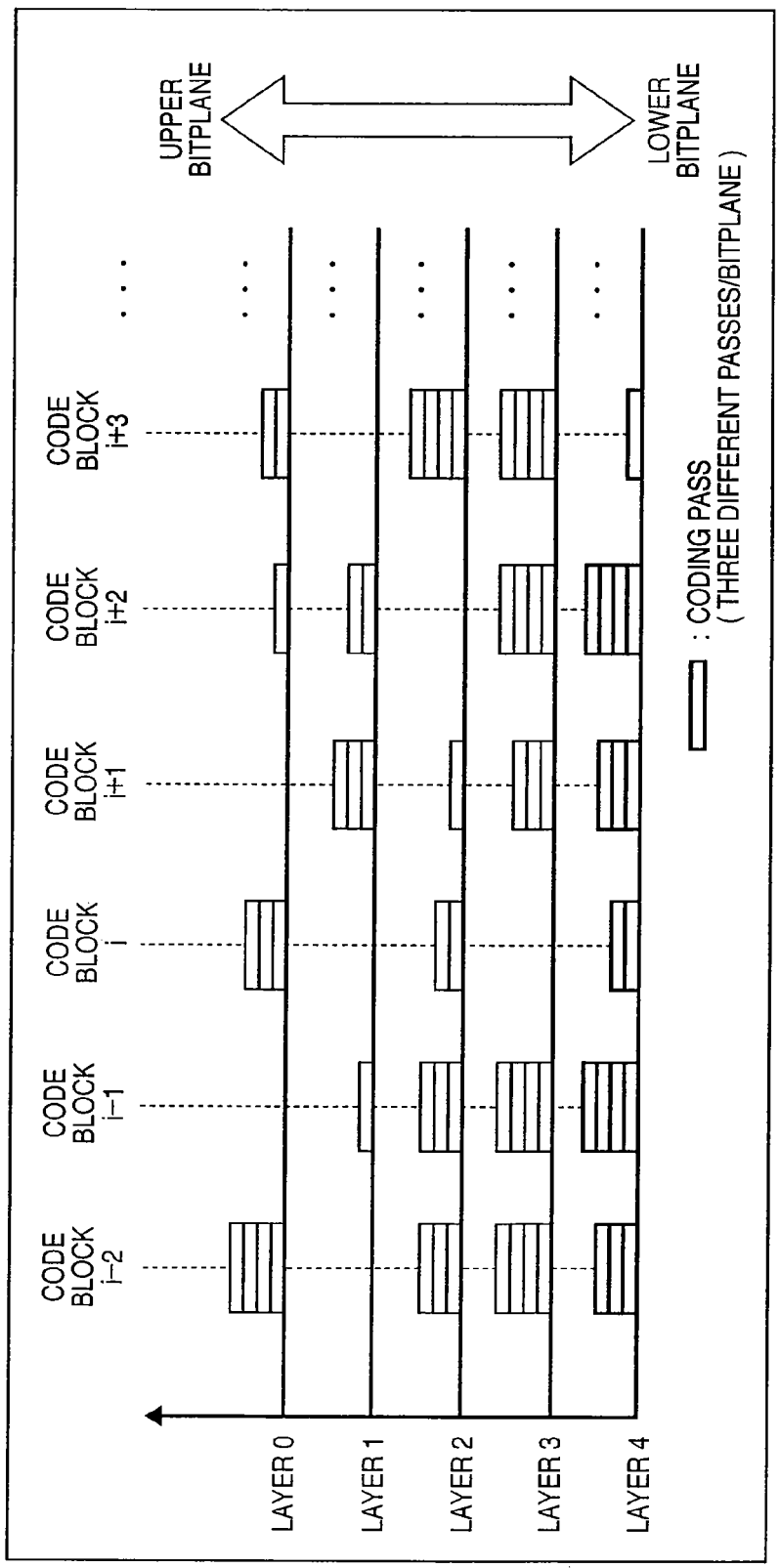
FIG. 15 is an explanatory view of layer generation.
Figure 16:
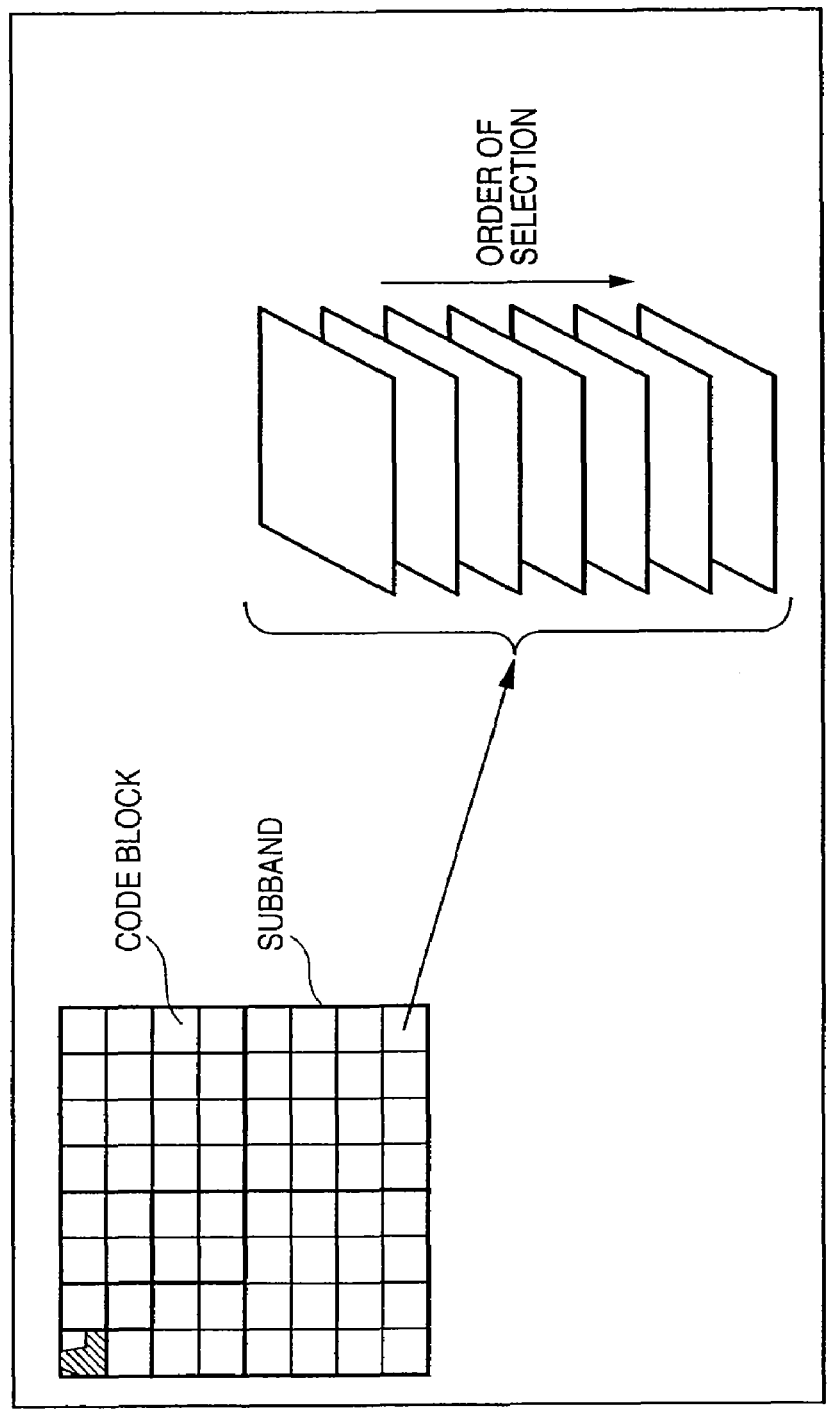
FIG. 16 is an explanatory view of layer generation.

The encoded tile data generator 307 forms layers after it collects the entropy-encoded coding passes from the plurality of code blocks in the plurality of subbands, as shown in FIG. 15. FIG. 15 shows a case wherein five layers are to be generated. Upon acquiring coding passes from an arbitrary code block, coding passes are always selected in turn from the uppermost one in that code block, as shown in FIG. 16. After that, the encoded tile data generator 307 arranges the generated layers in turn from an upper one, as shown in FIG. 17, and appends a tile header to the head of these layers, thus generating encoded tile data. This header stores information used to identify a tile, the code length of the encoded tile data, various parameters used in compression, and the like. Also, auxiliary information (e.g., the code length of each code block) may be inserted between neighboring encoded data, as needed. The encoded tile data generated in this way is output to an encoded frame data generator 308.

Whether or not tile data to be encoded still remain is determined in step S507 by comparing the value of counter i and the tile number. If tile data to be encoded still remain (i.e., i<N-1), counter i is incremented by 1 in step S508, and the flow returns to step S503 to repeat the processes up to step S507 for the next tile. If no tile data to be encoded remains (i.e., i=N-1), the flow advances to step S509.

Figure 18:
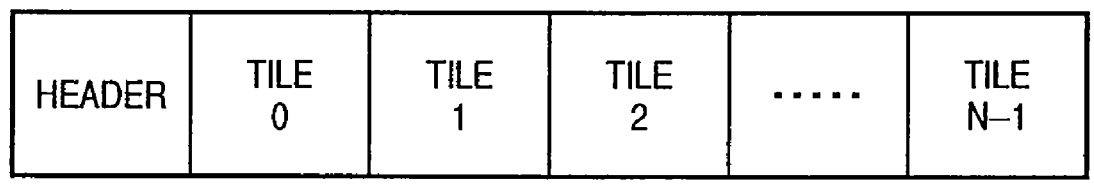
FIG. 18 is an explanatory view of the format of encoded frame data.

The encoded frame data generator 308 arranges the encoded tile data shown in FIG. 17 in a predetermined order (e.g., ascending order of tile number), as shown in FIG. 18, and appends a header to the head of these encoded tile data, thus generating encoded frame data (step S509). This header stores the vertical×horizontal sizes of the input image and each tile, information indicating the head position of each tile, various parameters used in compression, and the like. The encoded frame data generated in this way is output from an encoded frame data output section 309 to the data integration unit 205.

Moving Image Playback Apparatus

Figure 19:
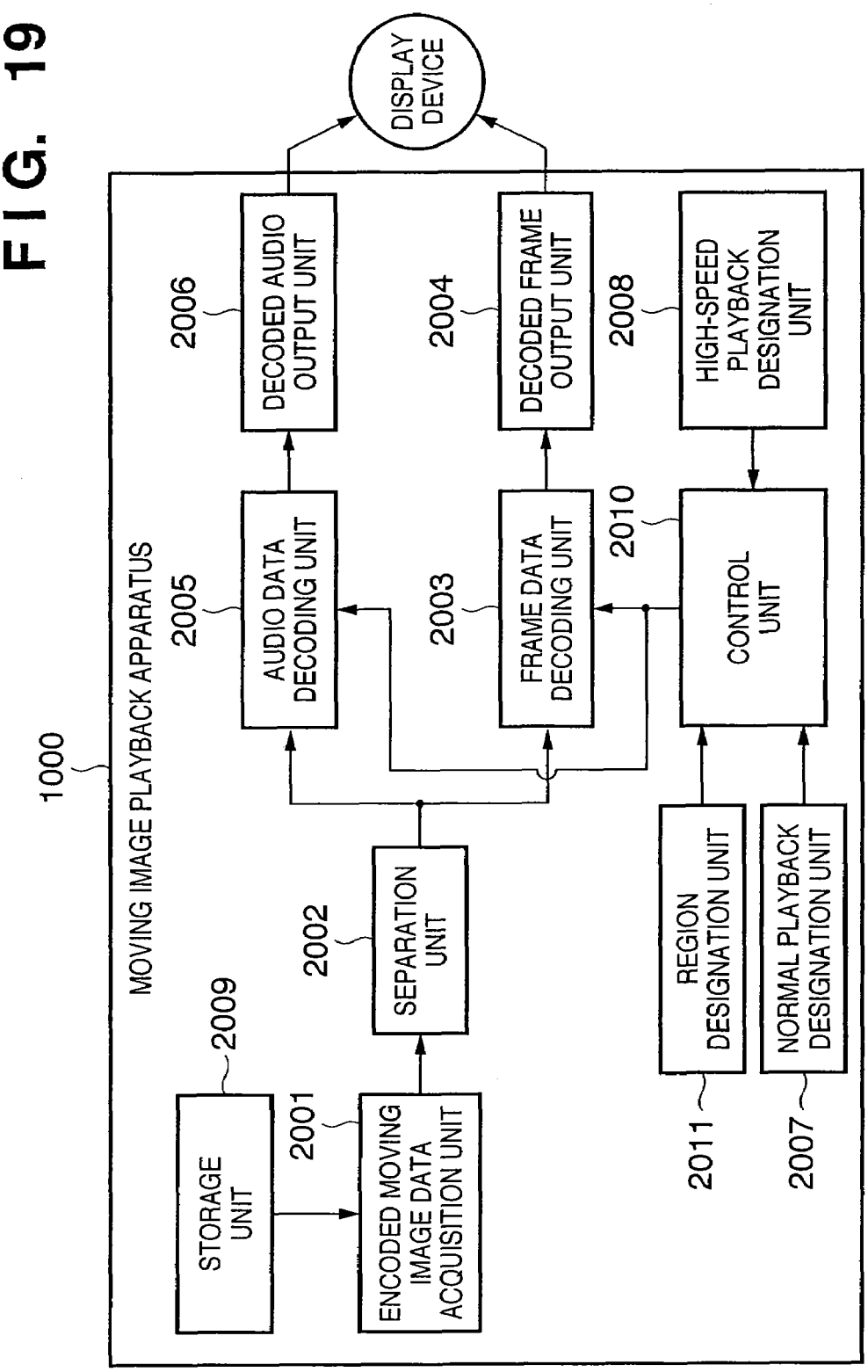
FIG. 19 is a schematic block diagram showing the arrangement of a moving image playback apparatus according to the first embodiment of the present invention.
Figure 20:
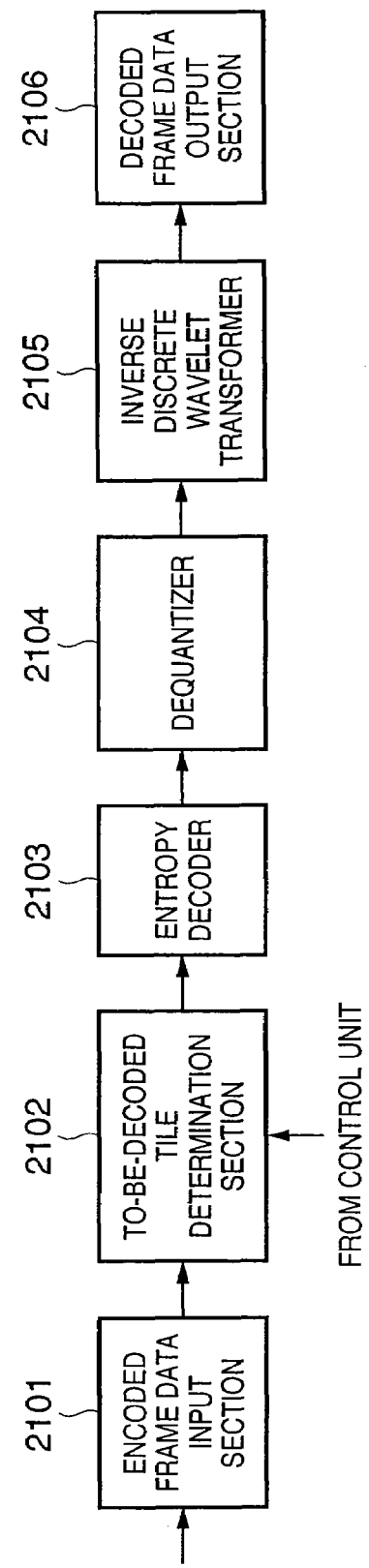
FIG. 20 is a schematic block diagram of a frame data decoding unit according to the first embodiment of the present invention.
Figure 21:
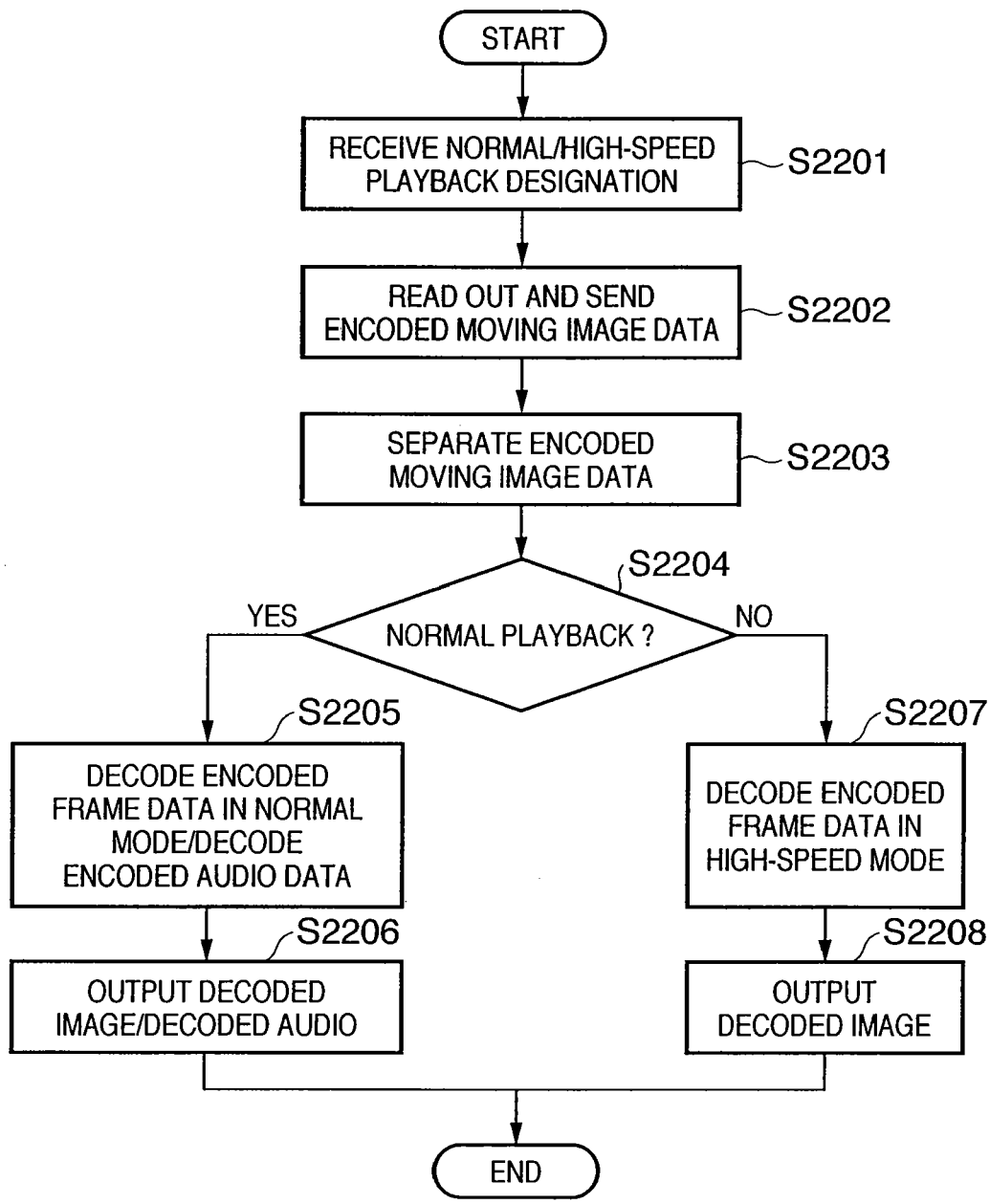
FIG. 21 is a flowchart of a moving image data decoding process to be executed by the moving image playback apparatus according to the first embodiment of the present invention.

FIG. 19 is a block diagram showing the arrangement of a moving image playback apparatus 1000 of this embodiment (it is also a functional block diagram of the PC 1 in FIG. 1), and FIG. 20 shows the arrangement of a frame data decoding unit 2003 in FIG. 19. FIG. 21 is a flowchart of the process of this moving image playback apparatus 1000. The decoding/playback process will be explained below with reference to these figures.

When the moving image playback apparatus 1000 receives a normal or high-speed playback designation from the user via a normal playback designation unit 2007 or high-speed playback designation unit 2008 (step S2201), an encoded moving image data acquisition unit 2001 reads out encoded moving image data from a storage unit 2009, and sends it to a separation unit 2002 (step S2202). Note that the normal playback designation unit 2007 and high-speed playback designation unit 2008 (double-speed in this embodiment) are displayed as GUI buttons on a display device, and a designation is issued by moving a cursor interlocked with a pointing device or the like and pressing the corresponding button. Alternatively, physical buttons or switches, a keyboard, or the like may be used as these units, and a designation method is not particularly limited.

Upon receiving the encoded moving image data, the separation unit 2002 separates that encoded moving image data into encoded frame data and encoded audio data (step S2203). The generated encoded frame data are output to the frame data decoding unit 2003, and the encoded audio data are output to an audio data decoding unit 2005. The frame data decoding unit 2003 is set with information indicating a tile position to be played back by a control unit 2010 on the basis of the playback method (normal/high-speed playback) designated by the user together with the encoded frame data. Note that the playback method of audio data falls outside the gist of the present invention, and a description of encoded audio data will be omitted.

At the beginning of a decoding process of the separated encoded frame data, the playback method designated by the user is checked (step S2204). If the user designates normal playback, the control unit 2010 sets the frame data decoding unit 2003 to decode the entire frame (all tiles). Therefore, the frame data decoding unit 2003 decodes the entire encoded frame data to generate frame data (step S2205). Also, the audio data decoding unit 2005 decodes encoded audio data to generate decoded audio data (step S2206).

On the other hand, if the user designates a playback method other than normal playback (i.e., designates high-speed playback), the control unit 2010 sets position information of a tile group to be decoded in the frame data decoding unit 2003 so as to decode a tile group that includes tiles substantially ½ the number of tiles per frame to form a rectangular region. The frame data decoding unit 2003 executes a decoding process of only set tile data of the input encoded data and ignores other data to decode the encoded frame data at high speed, thus generating decoded frame data (step S2207). Note that encoded audio data is not decoded in the high-speed playback mode.

The decoded frame data and audio data generated in step S2205, and the decoded frame data decoded at high speed in step S2207 are output from a decoded frame output unit 2004 and decoded audio output unit 2006 to a display device (step S2206 or S2208).

The process executed by the frame data decoding unit 2003 in FIG. 19 will be described below with reference to FIG. 20 that shows the detailed arrangement of the frame data decoding unit 2003, and the flowchart of FIG. 22.

Figure 23A:
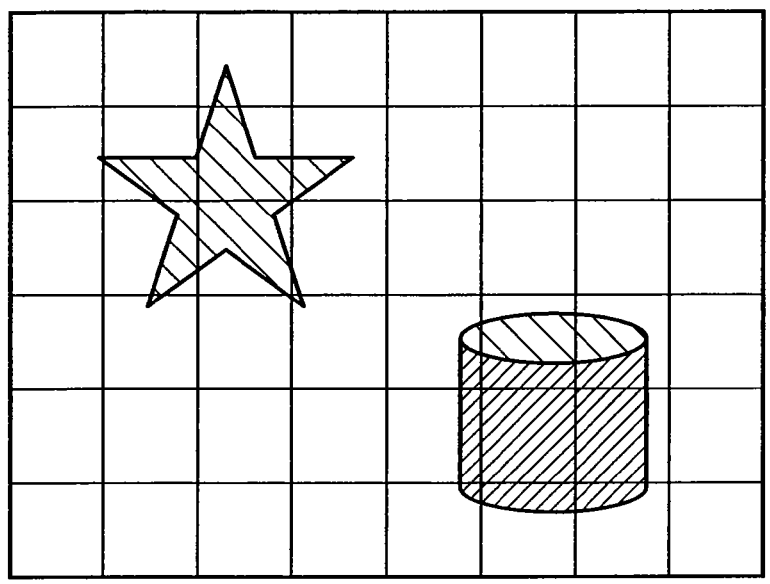
FIGS. 23A and 23B are explanatory views associated with determination of encoded tile data to be decoded in the first embodiment of the present invention.
Figure 23B:
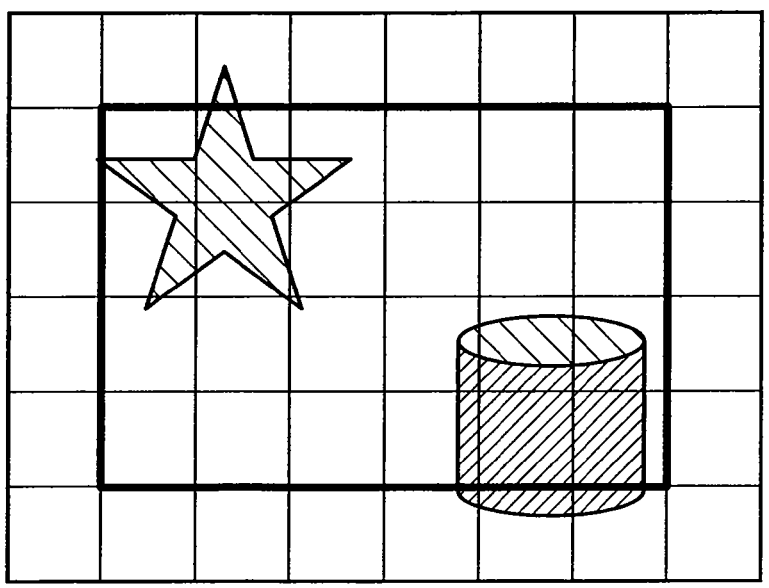

The encoded frame data and playback method information input to an encoded frame data input section 2101 are output to a to-be-decoded tile determination section 2102. If the playback method is normal playback, the to-be-decoded tile determination section 2102 determines all tiles in a frame shown in FIG. 23A as tiles to be decoded (step S2501). On the other hand, if the playback method is high-speed playback, the section 2102 displays the entire frame at the time of reception of the high-speed playback designation, as shown in FIG. 23B, and then determines some tiles in a frame as default tiles to be decoded in the high-speed playback mode (step S2501), as indicated by the bold line in FIG. 23B.

Note that the size of a region to be played back at high speed is half the area of the entire frame, and the load of the frame data decoding unit 2003 on the decoding process is substantially the same as that on normal playback. However, since the decoding process is done for respective tiles, an area S1 of a region to be decoded at thigh speed corresponds to a maximum size which is an integer multiple of tiles and does not exceed S0/2 (where S0 is the area of an original frame).

Figure 25:
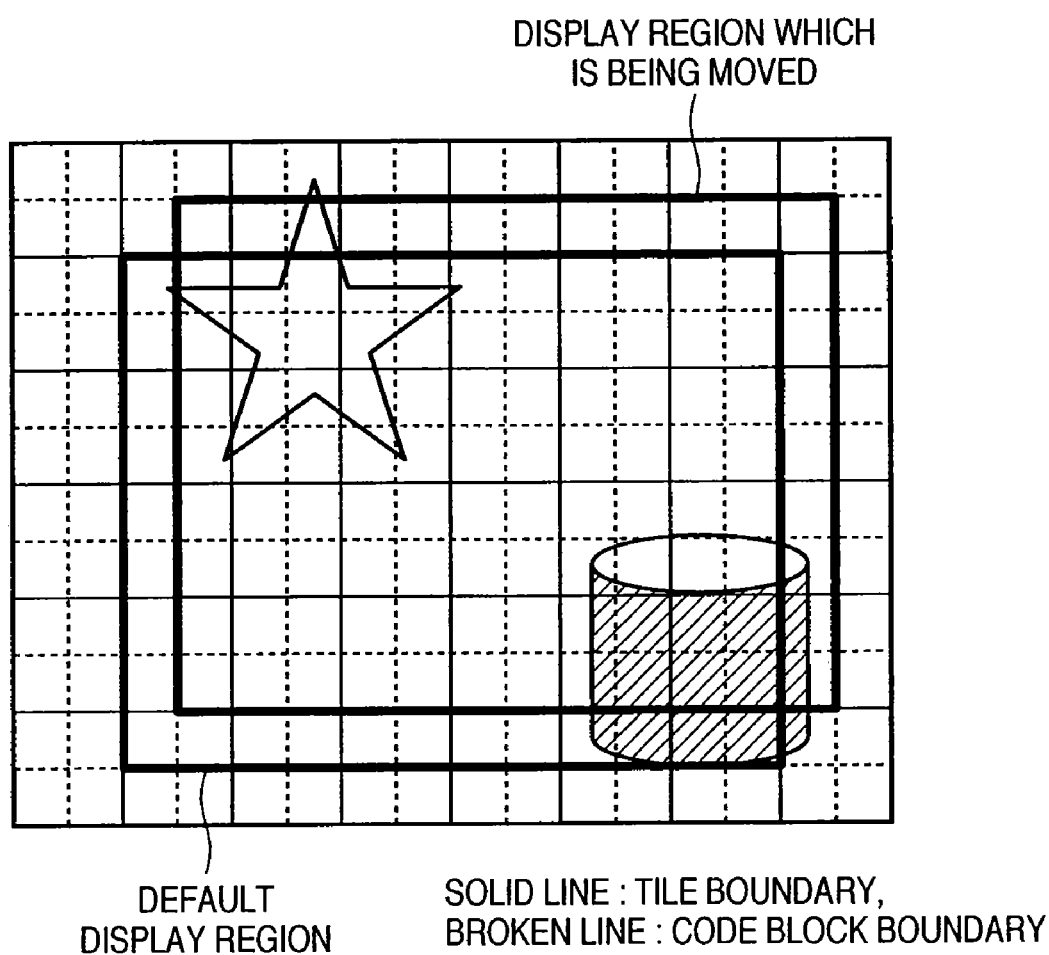
FIG. 25 is an explanatory view of movement of a display region.

Furthermore, if the user designates a change in position of the display region using a region designation unit 2011 during high-speed playback, tiles of the designated region are determined as those to be decoded, as indicated by the bold line in FIG. 25 (step S2501). At this time, since the region to be played back is determined, the control unit 1010 sets information that specifies tiles included in the set region in the frame data decoding unit 2003. At this time, if the region position to be played back is changed (to move the region), the entire frame is preferably temporarily played back to update the entire screen, and then to set the region. The region to be played back is moved for each tile size. The region designation unit 2011 is implemented by moving a cursor interlocked with a pointing device or the like, but it may be implemented by cursor keys or the like. Furthermore, upon determining tiles to be decoded, information stored in the main header and tile header is used. In FIG. 23B in the high-speed playback mode, inner 24 tiles (=4 (vertical)×6 (horizontal)) of a total of 48 tiles (=6 (vertical)×8 (horizontal)) are determined as tiles to be decoded. However, the present invention is not limited to this, and an arbitrary number of tiles that can be processed need only be selected in accordance with the processor speed. When the user selects the normal playback mode during high-speed playback, the entire frame is to be played back at 30 fps; when he or she switches the normal playback mode to the high-speed playback mode, the default tile position is set, or the tile position in the previous high-speed playback mode is set.

Figure 24:
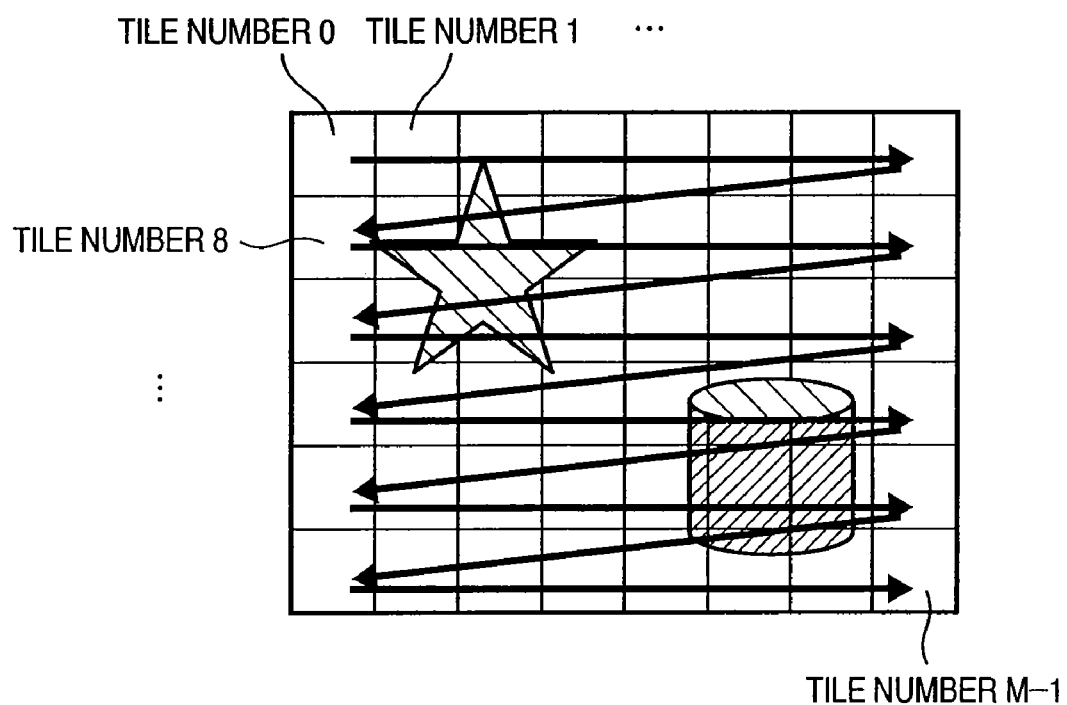
FIG. 24 is an explanatory view of identification number assignment to encoded tile data.

Let M be the number of tiles to be decoded, which are determined in this process. Then, numbers 0 to M−1 are assigned to the tiles to be decoded so as to identify respective tiles to be decoded. In this case, the numbers are assigned, so that the number increments from the upper left tile toward right neighboring tiles, and also from the uppermost tile toward lower tiles, as shown in FIG. 24.

After the tiles to be decoded are determined, a counter used to recognize a tile to be processed by the frame data decoding unit 2003 is set to i=0 (step S2502).

The encoded tile data to be decoded is input to an entropy decoder 2103 and undergoes entropy decoding, thus decoding quantized values (step S2503). The decoded quantized values are output to a dequantizer 2104. The dequantizer 2104 dequantizes the input quantized values to decode discrete wavelet transformation coefficients, and outputs them to an inverse discrete wavelet transformer 2105 (step S2504). Dequantization is done by:

$$Xr = Q \times q$$

where Q is the quantized value, q is the quantization step, and Xr is a decoded discrete wavelet transformation coefficient. The inverse discrete wavelet transformer 2105 computes the inverse discrete wavelet transforms (step S2505) by:

$$X(2n) = Y(2n) - \text{floor}\{(Y(2n-1) + Y(2n+1) + 2)/4\}$$

$$X(2n+1) = Y(2n+1) + \text{floor}\{(X(2n) + X(2n+2))/2\}$$

where Y(2n) is a discrete wavelet transformation coefficient of a lower-frequency subband, and Y(2n+1) is that of a higher-frequency subband. Also, X(n) is decoded data. These transformation formulas are used for one-dimensional data. By applying this transformation in turn in the horizontal and vertical directions, two-dimensional transformation is implemented. Then, decoded tile data is generated and is output to a decoded frame data output section 2106 (step S2506).

Whether or not tiles to be decoded still remain is determined in step S2507 by comparing counter i and the tile number. If tiles to be decoded still remain (i.e., i<M−1), counter i is incremented by 1 in step S2508, and the flow returns to step S2503 to repeat the processes up to step S2507 for the next tile. On the other hand, if no tile to be decoded remains in step S2507 (i.e., i=M−1), the flow advances to step S2509.

The decoded frame data output section 2106 generates decoded frame data by arranging the decoded tile data in the order of i=0, . . . , M−1, and outputs that data to the decoded frame output unit 2004 (step S2508).

As described above, according to the first embodiment of the present invention, since some tiles of each frame are played back in the high-speed playback mode, a smooth playback image can be displayed within the processing performance of the PC. Also, since the user can freely move the display region, he or she can sufficiently enjoy a smooth high-speed playback image even when the ROI falls outside the display region.

In the first embodiment, blocks half those of each frame are played back in the high-speed playback mode, thereby playing back an image at a speed twice that in the normal playback mode. However, the present invention is not limited to such specific method.

More specifically, designation inputs (buttons) of ½-speed, equal-speed, double-speed, triple-speed, quadruple-speed, . . . are prepared, and the entire frame is played back when a playback speed equal to or lower than the equal speed is selected. When triple- or quadruple-speed playback beyond equal-speed playback is designated, tiles 1/3 or 1/4 of the total number of tiles of each frame are selected as tiles to be decoded, and an image can be smoothly played back in the triple- or quadruple-speed playback mode. In this manner, by playing back an image corresponding to blocks at an arbitrary ratio, playback can be made at a desired multiple speed.

The frequency of the vertical sync signal of a display device of a PC or the like is about 100 Hz at the most. On the other hand, a decoded image is displayed by writing data in a video memory in practice. More specifically, if frame images are written in the video memory at 30 frames/s, the user consequently recognizes them as a moving image at 30 fps; if they are written at 60 fps, he or she recognizes them as a moving image at 60 fps. Therefore, if the frequency of the vertical sync signal of a display device is 100 Hz, and the quadruple-speed playback mode (120 fps) is designated, such mode surpasses the performance of the display device, and data for 20 fps are wasted. Hence, an upper limit may be set for the high-speed playback mode, and high-speed playback beyond the upper limit may be aborted.

In the above description of this embodiment, a region having an area 1/2 that of one frame is to be decoded in the double-speed playback mode, and a region having an area 1/3 that of one frame is to be decoded in the triple-speed playback mode. Alternatively, the processing performance of the apparatus may be verified in advance, and a region to be decoded may be determined based on the verification result. For example, in software implementation, if a CPU is capable of performing playback at 40 fps, an area larger than the half area may be played back at the double speed.

Second Embodiment

The second embodiment will be described below.

The first embodiment has described the method of displaying a smooth playback image by playing back some tiles of each frame within the processing performance of the PC, and allowing the user to freely move the display region.

The display region is moved for respective tiles, as described in the first embodiment. Therefore, the display region is moved to discrete positions, thus impressing the user unnatural.

Hence, in the second embodiment, a code block is used as a decoding unit in the high-speed playback mode in place of a tile, thus implementing the high-speed playback method that allows smooth movement of the display region. A practical method will be described below. Note that encoded moving image data which allows such display can use data generated by the moving image encoding device in the first embodiment. Therefore, in the description of the second embodiment, the arrangement and processing operation of the moving image encoding device will be omitted.

Moving Image Playback Apparatus

The arrangement of the moving image playback apparatus in the second embodiment is the same as that shown in FIG. 19. Also, the processes executed upon designation of the normal playback mode and high-speed playback mode are the same as those in the first embodiment. However, when the user issues a move designation of the display region, a process different from that in the first embodiment is executed.

For example, when the user designates to display a region indicated by the bold line in FIG. 25, the moving image playback apparatus classifies tiles to those which are to be decoded for respective tiles (tiles of type A), and those which are to be decoded for respective code blocks (tiles of type B).

After that, the moving image playback apparatus decodes tiles of type A by the same method as in the first embodiment. On the other hand, upon decoding tiles of type B, the moving image playback apparatus accesses the head of each code block using information in the tile header of the tile of interest and auxiliary information to decode the code block of interest. In this way, decoding for respective code blocks is implemented. Note that the control unit 2010 sets tile numbers and code block numbers in each tile.

As described above, according to the second embodiment, since the display region is moved for respective code blocks in place of tiles during high-speed playback, the display region can be moved more smoothly than in the method described in the first embodiment.

Third Embodiment

The third embodiment will be described below.

The first embodiment has described the method of displaying a smooth playback image by playing back some tiles of each frame within the processing performance of the PC, and allowing the user to freely move the display region.

In the second embodiment, the display region is moved for respective code blocks, which are sufficiently smaller than tiles, but the display region may be moved still awkwardly.

Figure 27:
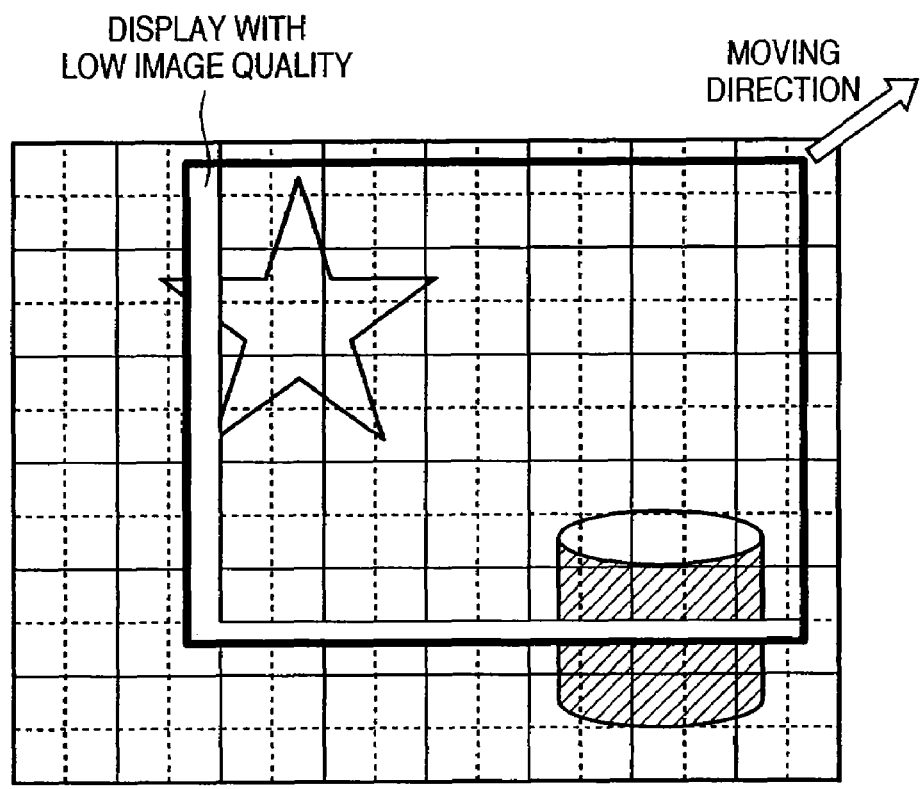
FIG. 27 is an explanatory view of a method of displaying a part of a display region with low image quality.

Hence, in the third embodiment, the moving image playback apparatus decodes code blocks that include a display region to be played back at high speed, as shown in FIG. 27. Then, the moving image playback apparatus displays pixels in the display region on a display. Since such playback method increases the load of the playback apparatus, a region in a direction opposite to the moving direction is displayed with low image quality. The reason why the region in the direction opposite to the moving direction is selected as a region to be displayed with low image quality is that user's attention is normally focused on the region in the moving direction, but is not focused on the region in the direction opposite to the moving direction. A practical method will be described below. Note that encoded moving image data which allows such display can use data generated by the moving image encoding device in the first embodiment. Therefore, in the description of the third embodiment, the arrangement and processing operation of the moving image encoding device will be omitted.

Moving Image Playback Apparatus

Figure 26:
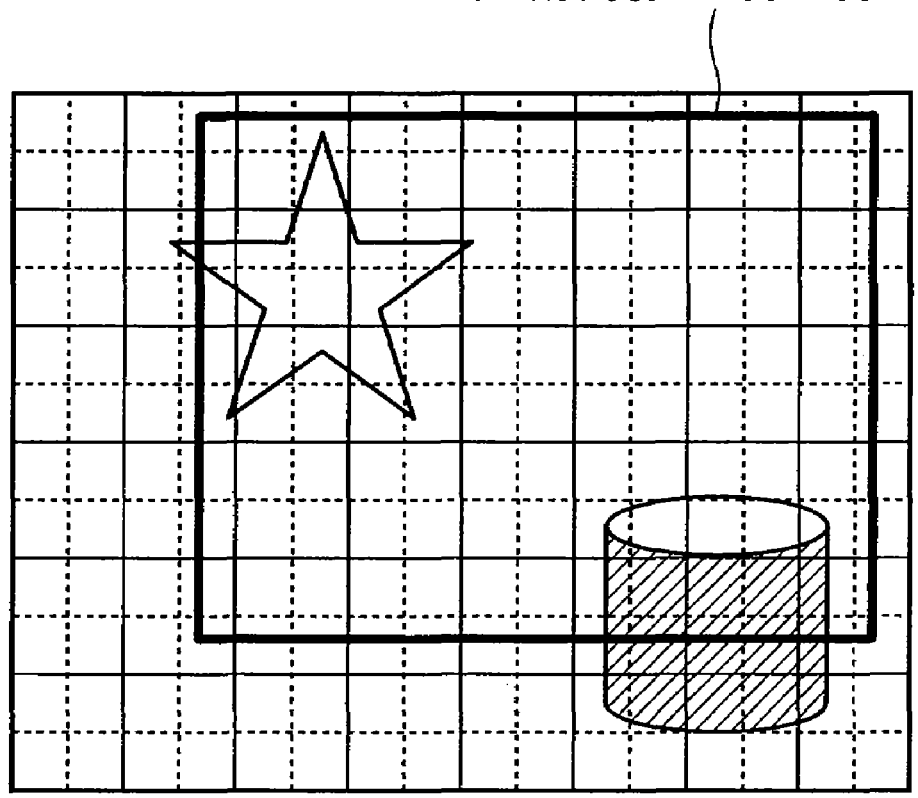
FIG. 26 is an explanatory view of a display region which does not contact a code block boundary.

The arrangement of the moving image playback apparatus in the third embodiment is the same as that shown in FIG. 19. Also, the processes executed upon designation of the normal playback mode and high-speed playback mode are the same as those in the first embodiment. When the display region is being moved, and contacts a code block boundary, the process to be executed by the moving image playback apparatus is the same as that in the second embodiment. However, when the display region does not contact the code block boundary, as shown in FIG. 26, the following process is executed.

If the display region is being moved (during movement), as shown in FIG. 27, only upper layers (e.g., layers 0, 1, and 2) of code blocks of a region in a direction opposite to the moving direction are decoded. In this manner, an increase in processing volume due to an increase in area of the region to be decoded can be prevented.

As described above, according to the third embodiment, since code blocks that include the display region are decoded during high-speed playback, the display region can be moved for respective pixels. An increase in processing volume due to this decoding method can be avoided by decoding the non-ROI of the user with low image quality.

Fourth Embodiment

In the first to third embodiments described above, the range ½ the frame to be decoded is set in the high-speed playback mode. That is, the user cannot observe an image outside that range. Hence, a modification that improves such drawback will be described below as the fourth embodiment.

Note that the fourth embodiment to be described below can be optimally applied to mobile products such as a mobile PC, video camera, and the like, whose power consumption must be suppressed compared to a desktop PC and the like. Note that the apparatus arrangement is the same as that in the first embodiment.

Using the arrangement of the frame data decoding unit 2003 shown in FIG. 20 above, the process of the fourth embodiment will be described below with reference to the flowchart of FIG. 28. In this flowchart, the decoding rate determination step (S2510) is added to that shown in FIG. 22.

The encoded frame data and playback method information input to the encoded frame data input section 2101 are output to the to-be-decoded tile determination section 2102.

If the playback method is high-speed playback, the section 2102 determines some tiles in each frame as those to be played back smoothly, and other tiles as those to be played back non-smoothly, as indicated by the bold line in FIG. 23B (step S2501).

In FIG. 23B in the high-speed playback mode, inner 24 tiles (=4 (vertical)×6 (horizontal)) of a total of 48 tiles (=6 (vertical)×8 (horizontal)) are determined as tiles to be decoded. However, the present invention is not limited to this, and an arbitrary number of tiles that can be processed need only be selected in accordance with the processor speed.

Figure 29:
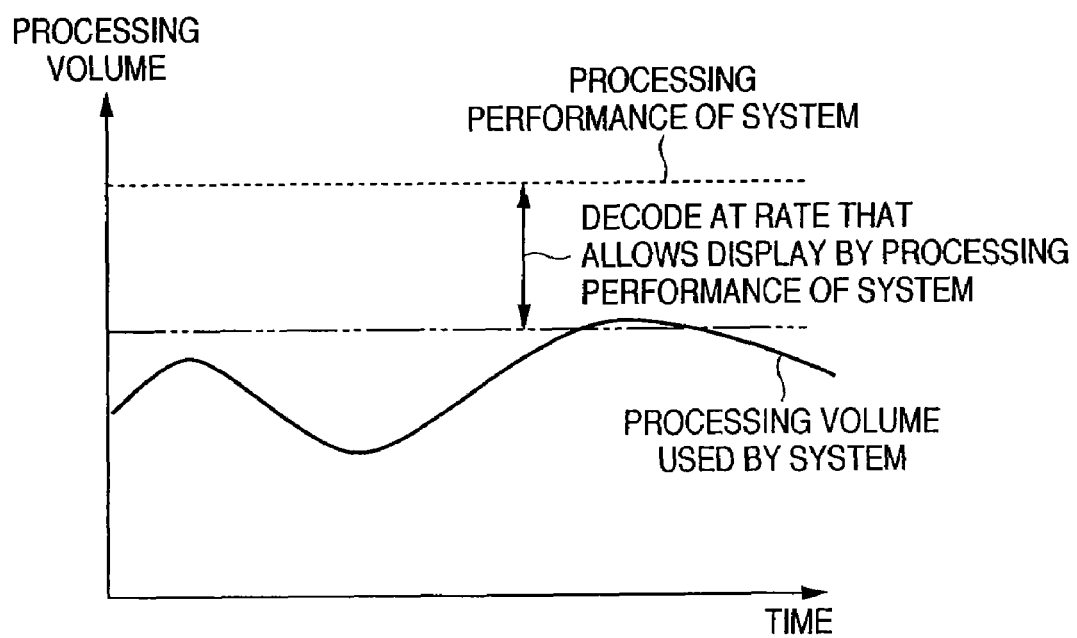
FIG. 29 is an explanatory view of the display rate of a non-smooth display region.

In the decoding rate determination step (S2510), it is determined that all tiles are decoded and displayed at 30 fps in the normal playback mode. In the high-speed playback mode (double-speed mode), smooth display tiles are decoded and displayed at 60 fps. In addition, non-smooth tiles are decoded and displayed at a possible rate by utilizing the remaining processing performance of the PC or video camera, as shown in FIG. 29. In this embodiment, this rate is 5 fps on average.

Figure 22:
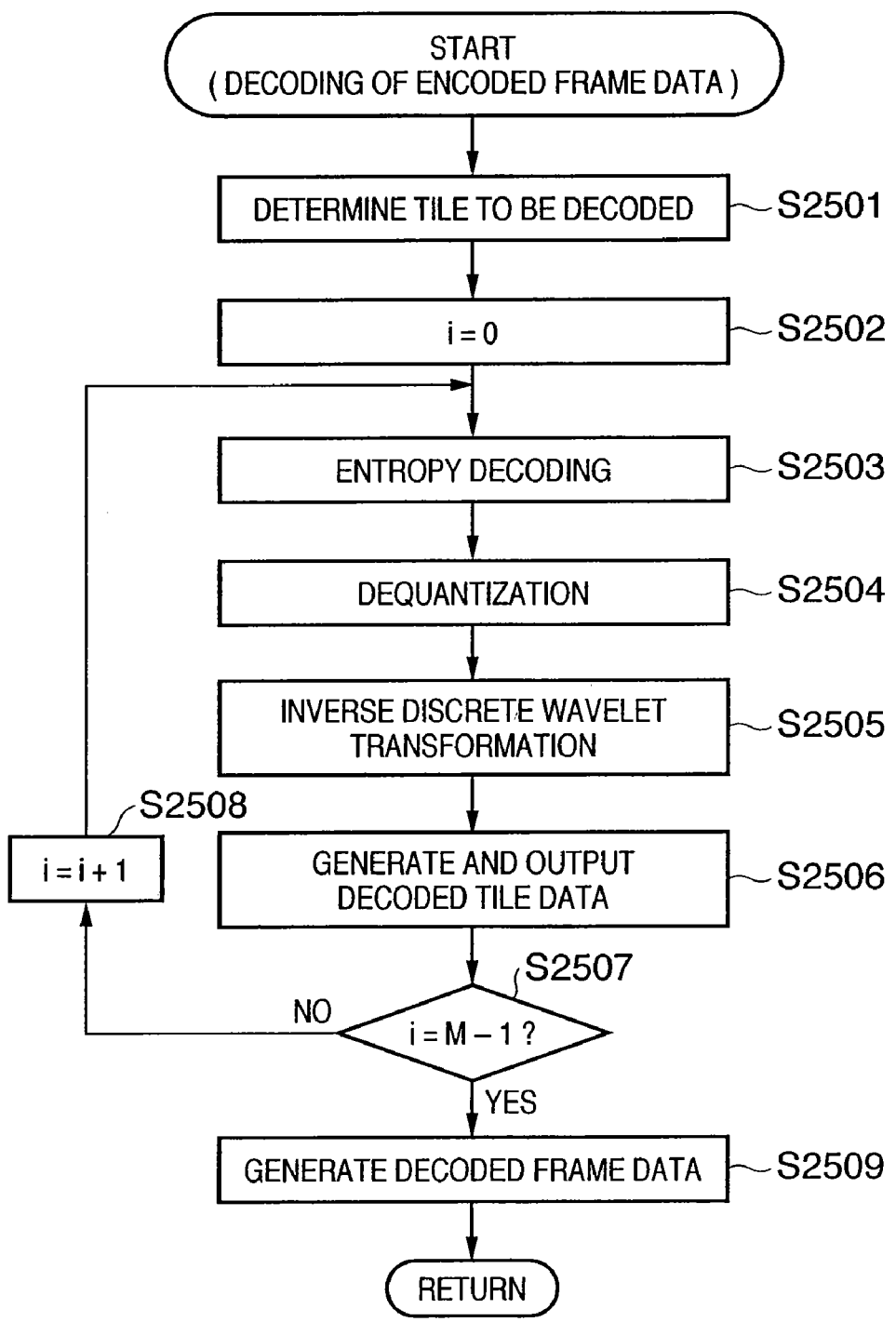
FIG. 22 is a flowchart of a frame data decoding process to be executed by the frame data decoding unit according to the first embodiment of the present invention.
Figure 28:
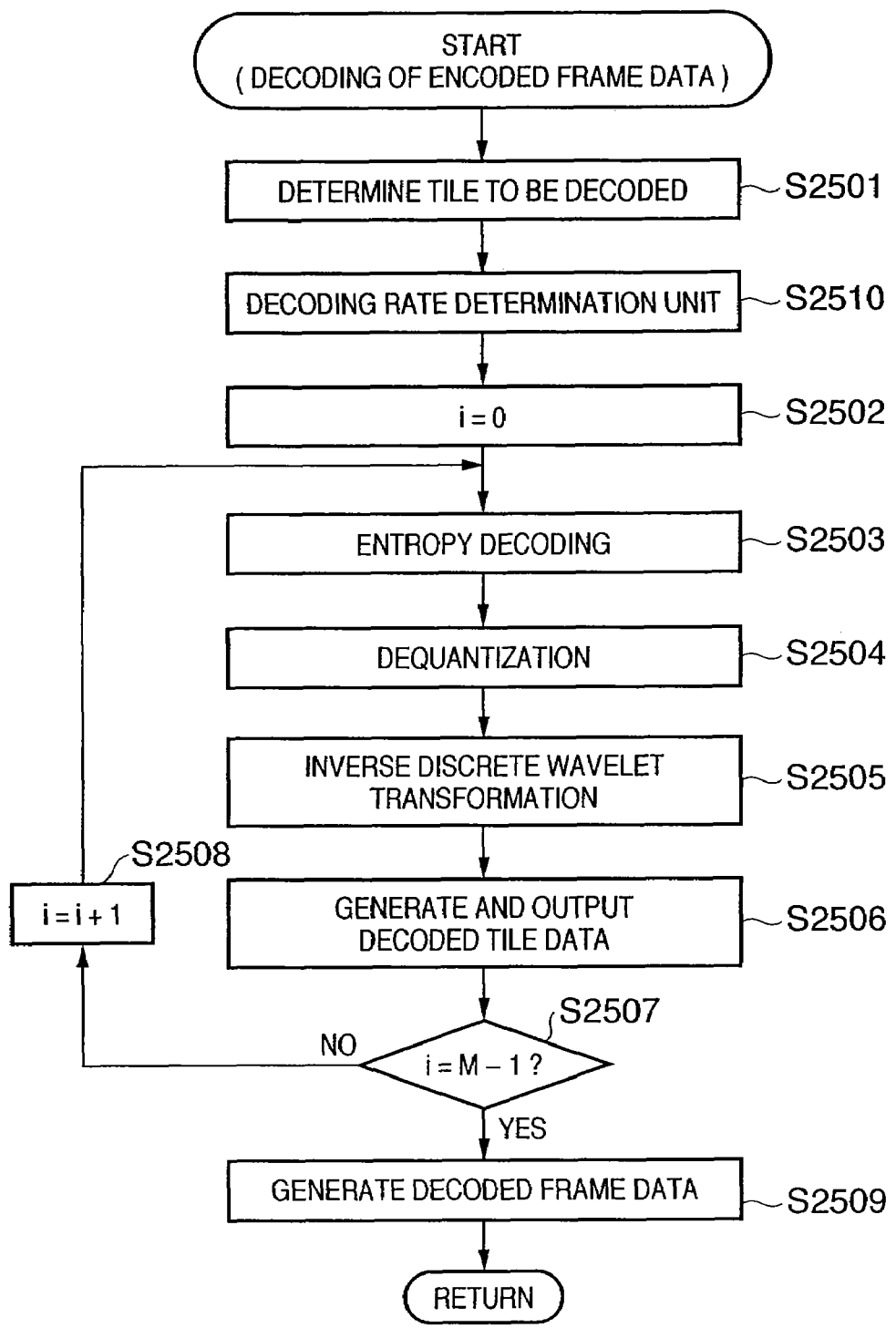
FIG. 28 is a flowchart of a moving image data encoding process to be executed by a moving image playback apparatus according to the fourth embodiment of the present invention.

Since step S2502 and subsequent steps in FIG. 28 are the same as those in FIG. 22, a description thereof will be omitted.

According to the fourth embodiment, some tiles of each frame can be smoothly displayed at a high frame rate and other tiles are displayed at a high possible frame rate in the high-speed playback mode. Hence, the entire video region can be displayed, and high-speed playback convenient for the user can be provided.

Fifth Embodiment

The fourth embodiment has exemplified the case wherein a non-smooth display region is decoded and displayed at a minimum rate at which the system can decode and display. The fifth embodiment will exemplify a case wherein the decoding rate of the non-smooth display region is varied in real time in correspondence with a change in processing performance which is not utilized by the system along with an elapse of time. In this manner, the user can always enjoy a video picture in the non-smooth display region at a high possible display rate of the system.

Since the moving image encoding method and decoding method in the fifth embodiment have the same contents as those described in the fourth embodiment, only a characteristic feature of this embodiment will be extracted and explained below.

Figure 30:
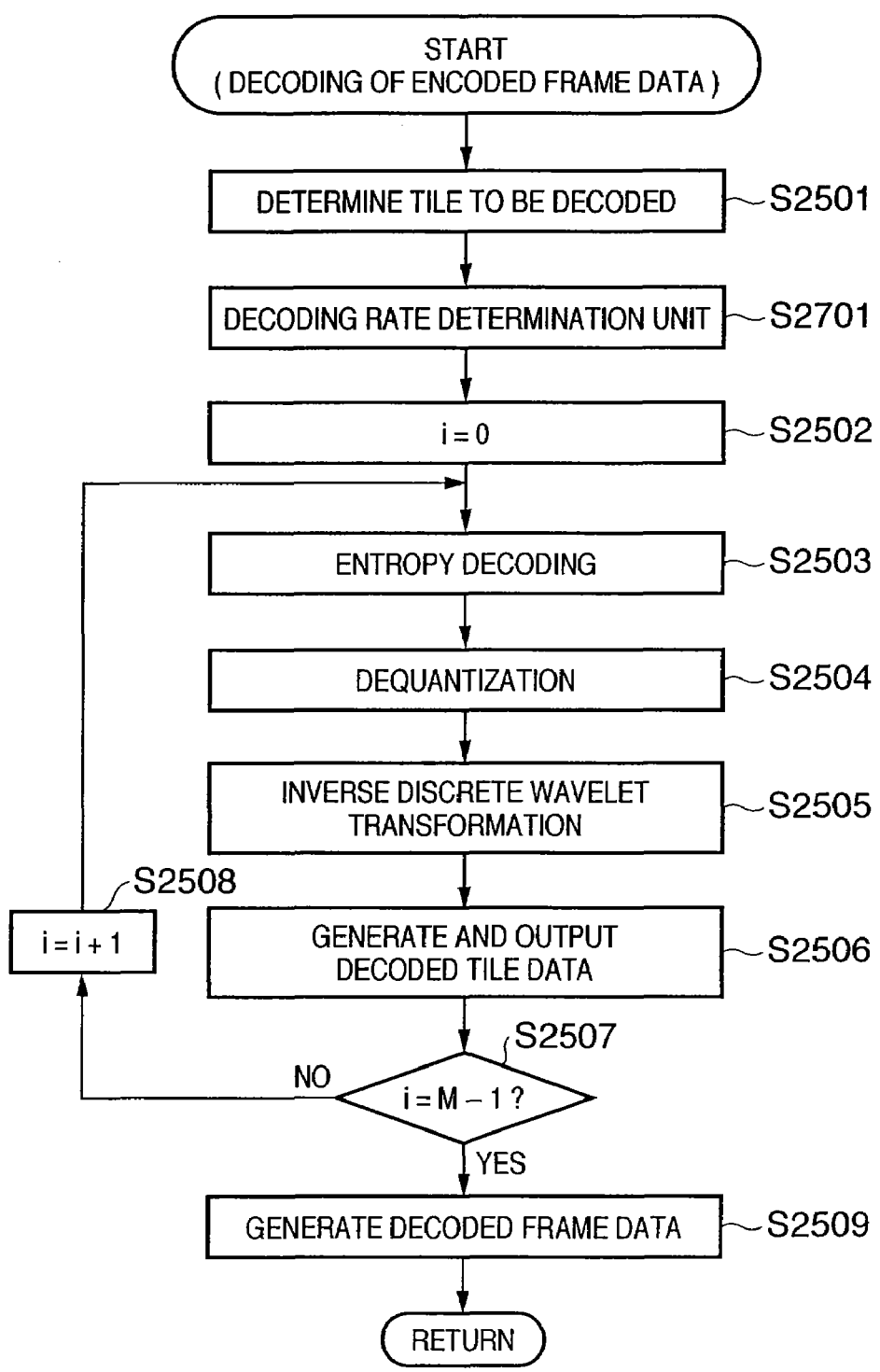
FIG. 30 is a flowchart of a moving image data encoding process to be executed by a moving image playback apparatus according to the fifth embodiment of the present invention.

FIG. 30 is a flowchart of the fifth embodiment. In this flowchart, the decoding rate determination step (S2510) in FIG. 28 in the fourth embodiment is replaced by the decoding rate determination step (S2701).

Figure 31:
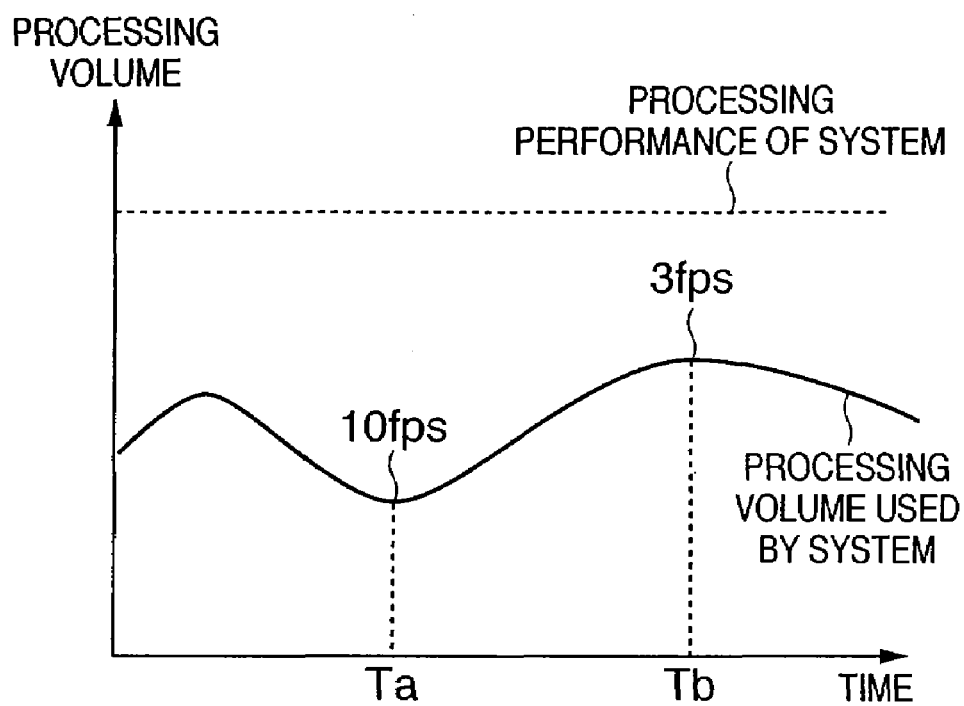
FIG. 31 is an explanatory view of the display rate of a non-smooth display region.

As this decoding rate determination step S2701, the system such as the PC, video camera, or the like changes the decoding frame rate according to the remaining processing performance. For example, the system decodes at 10 fps at time Ta in FIG. 31, and at 3 fps at time Tb.

As described above, according to the fifth embodiment, the decoding rate of the non-smooth display region is varied in correspondence with a change in processing performance, which is not used by the system, along with an elapse of time. The user can always enjoy a video picture of the non-smooth display region at a high possible display rate of the system.

Sixth Embodiment

In the fourth embodiment, a non-smooth display region is decoded and displayed at a minimum rate at which the system can decode and display. However, when the minimum value of the remaining processing performance of the system is very small, all of non-smooth display tiles cannot often be displayed. This embodiment will explain a decoding method of a non-smooth display region when the minimum value of the remaining processing performance is very small.

Since the moving image encoding method and decoding method in the fifth embodiment have the same contents as those described in the fourth embodiment, only a characteristic feature of this embodiment will be extracted and explained below.

FIG. 32 is a flowchart of the sixth embodiment. In this flowchart, the decoding rate determination step (S2510) in FIG. 28 in the fourth embodiment is replaced by the decoding rate determination step (S2901).

Figure 33:
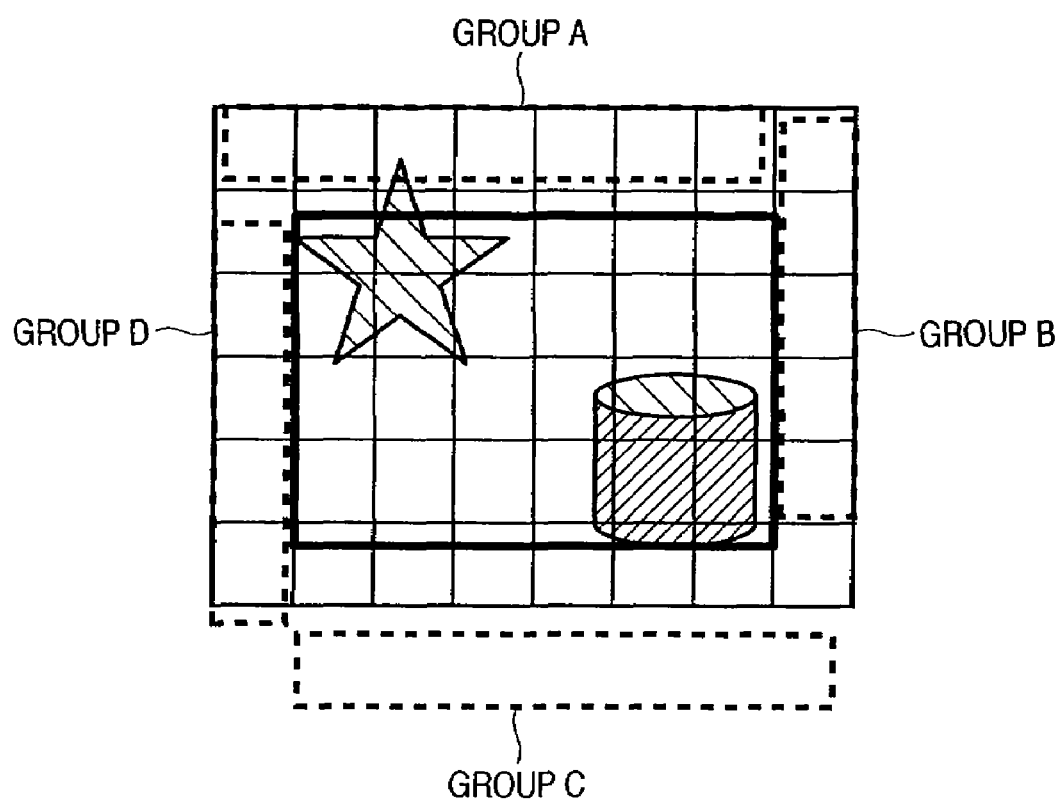
FIG. 33 is an explanatory view of a display method of a non-smooth display region.

In this decoding rate determination step S2901, the system such as the PC, video camera, or the like determines the decoding rate and non-smooth display tiles to be decoded on the basis of the minimum value of the remaining processing performance. Note that the non-smooth display tiles to be decoded are determined to decode group A at a given decoding time, group B at the next decoding time, group C at the still next decoding time, and group D at the still next decoding time, as shown in FIG. 33.

As described above, according to the sixth embodiment, since some of non-smooth display tiles are decoded at a low rate, the user can always enjoy a video picture of the non-smooth display region even when the remaining processing performance is very low.

Seventh Embodiment

In general, upon sensing an image using a video camera or the like, the ROI of a photographer is often present near the center of the screen. For this reason, a region closer to the center is preferably decoded at a higher frame rate to display a smooth video picture. For this purpose, the fourth embodiment has exemplified the method of dividing the screen into a smooth display region and non-smooth display region, and playing them back at high speed at different frame rates. The seventh embodiment takes that idea one step further, and divides the non-smooth display region into two regions from the center of the screen to the outer direction to define first and second non-smooth display regions. The first non-smooth display region is decoded at a higher frame rate than the second non-smooth display region. In this way, the ROI of the user can be displayed at a higher frame rate.

Since the moving image encoding method and decoding method in this embodiment have the same contents as those described in the fourth embodiment, only a characteristic feature of this embodiment will be extracted and explained below.

Figure 34:
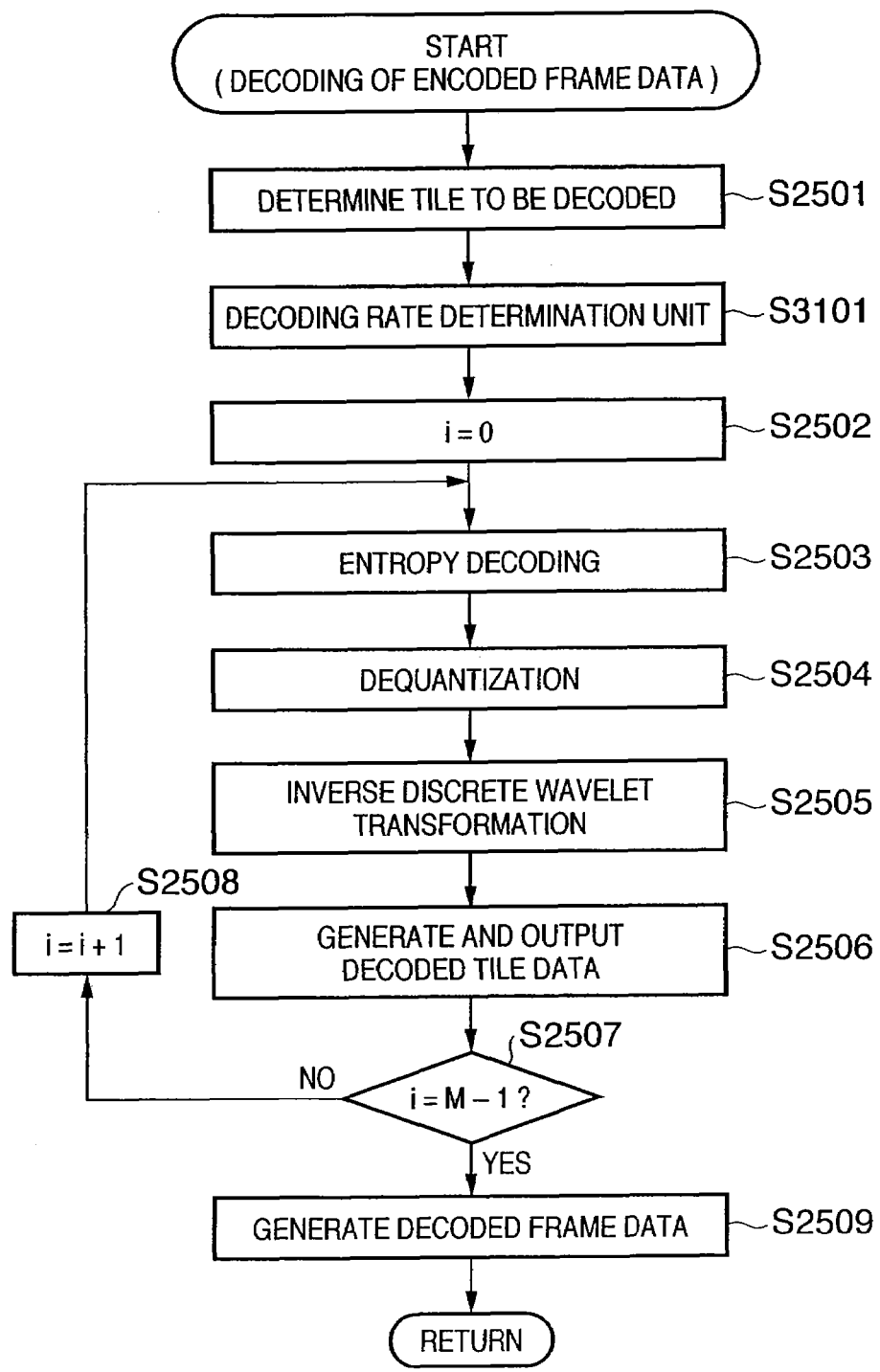
FIG. 34 is a flowchart of a moving image data encoding process to be executed by a moving image playback apparatus according to the seventh embodiment of the present invention.

FIG. 34 is a flowchart of this embodiment. In this flowchart, the decoding rate determination step (S2510) in FIG. 28 in the fourth embodiment is replaced by the decoding rate determination step (S3101).

Figure 35:
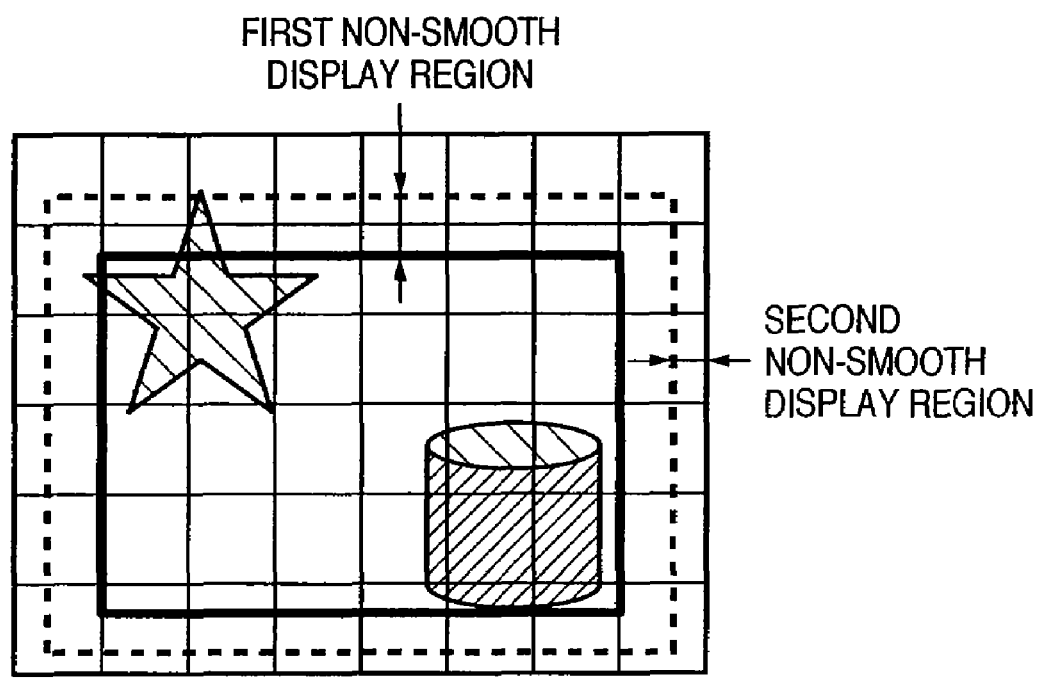
FIG. 35 is an explanatory view of a display method of a non-smooth display region.

In this decoding rate determination step S3101, the system such as the PC, video camera, or the like determines the decoding rates of the non-smooth display regions on the basis of the minimum value of the remaining processing performance. For example, the system determines 10 fps as the decoding rate for the first non-smooth display region, and 5 fps as that for the second non-smooth display region, as shown in FIG. 35.

Note that only the first non-smooth display region is decoded for each frame, and this process can be achieved by decoding for respective code blocks in each tile. Since such process falls outside the gist of the present invention, a detailed description thereof will be omitted.

As described above, according to the seventh embodiment, since some of non-smooth display tiles are decoded at a low rate, the first non-smooth display region is decoded at a higher frame rate than the second non-smooth display region. In this way, the ROI of the user can be displayed at a higher frame rate.

Eighth Embodiment

The fourth embodiment has exemplified the method of performing high-speed playback at different frame rates by dividing the screen into a smooth display region and non-smooth display region. This method is effective when the ROI of the photographer is located at the central portion of the screen, but is not effective when the ROI is located near the frame of the screen. Hence, this embodiment allows the browser to move the smooth display region. In this way, the ROI of the browser is always displayed within the smooth display region.

Since the moving image encoding method and decoding method in this embodiment have the same contents as those described in the fourth embodiment, only a characteristic feature of this embodiment will be extracted and explained below.

Figure 36:
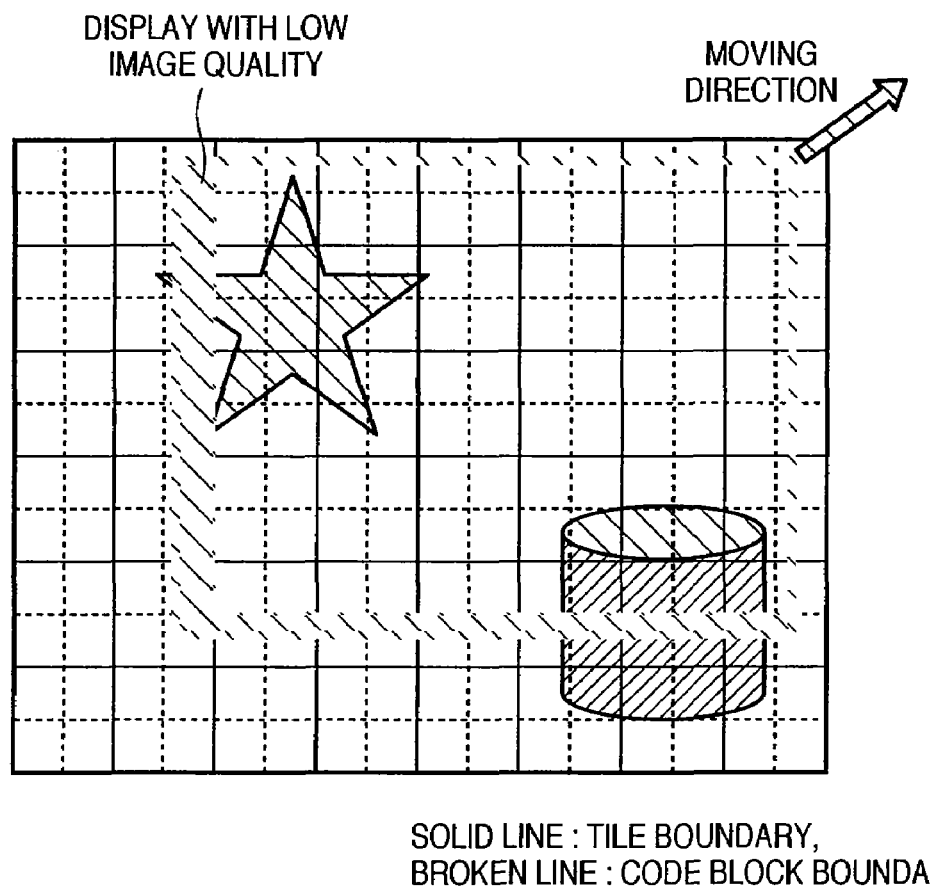
FIG. 36 is an explanatory view of movement of a smooth display region and a display method upon movement.
Figure 37:
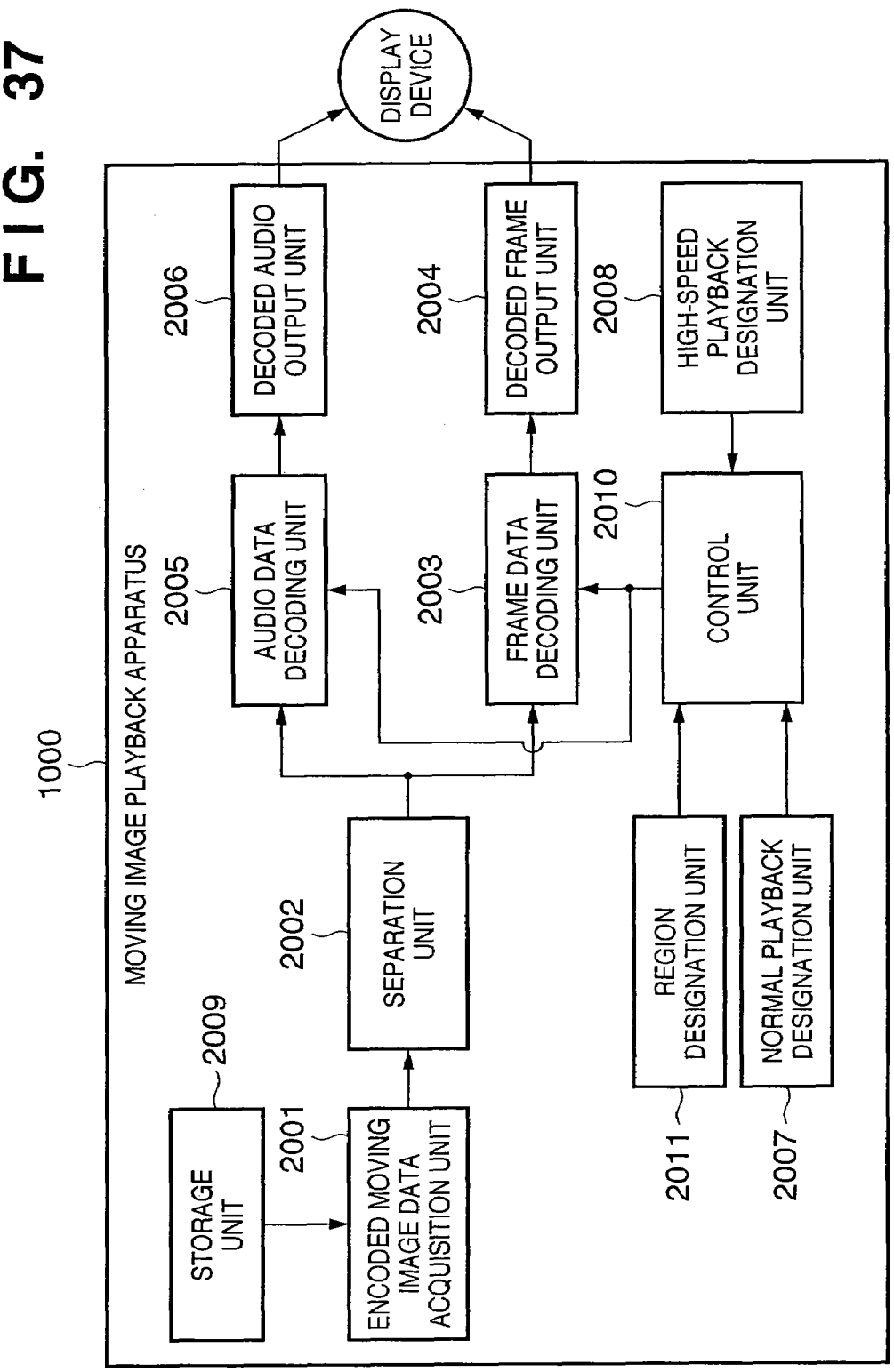
FIG. 37 is a block diagram of a moving image playback apparatus according to the eighth embodiment of the present invention.

FIG. 37 shows an image playback apparatus of this embodiment. In FIG. 37, when the user designates to change the display region using a region designation unit 2011, code blocks including the designated region are determined as tiles to be decoded, as indicated by the bold line in FIG. 36 (step S2501). Note that a mouse, cursor keys, or the like may be used as the region designation unit 2011.

Since such playback method increases the load of the playback apparatus, a region in a direction opposite to the moving direction is displayed with low image quality, as shown in FIG. 36. The reason why the region in the direction opposite to the moving direction is selected as a region to be displayed with low image quality is that user's attention is normally focused on the region in the moving direction, but is not focused on the region in the direction opposite to the moving direction. A practical method will be described below.

When the display region is being moved, and contacts a code block boundary, the moving image playback apparatus accesses and decodes the head of each code block to be decoded by utilizing the head information of the code block in the main header or tile header.

When the display region does not contact the code block boundary, only upper layers (e.g., layers 0, 1, and 2) of code blocks of a region in a direction opposite to the moving direction are decoded. In this manner, an increase in processing volume can be suppressed.

As described above, according to the eighth embodiment, since the user can move the smooth display region, even when his or her ROI falls outside a default smooth display region, the user can browse his or her ROI within the smooth display region.

Ninth Embodiment

The fourth embodiment has exemplified the method of performing high-speed playback at different frame rates by dividing the screen into a smooth display region and non-smooth display region. This method is effective when the ROI of the photographer is located at the central portion of the screen, but is not effective when the ROI is located near the frame of the screen. Hence, this embodiment allows the browser to switch between the smooth display region and non-smooth display region.

Since the moving image encoding method and decoding method in this embodiment have the same contents as those described in the fourth embodiment, only a characteristic feature of this embodiment will be extracted and explained below.

Figure 38:
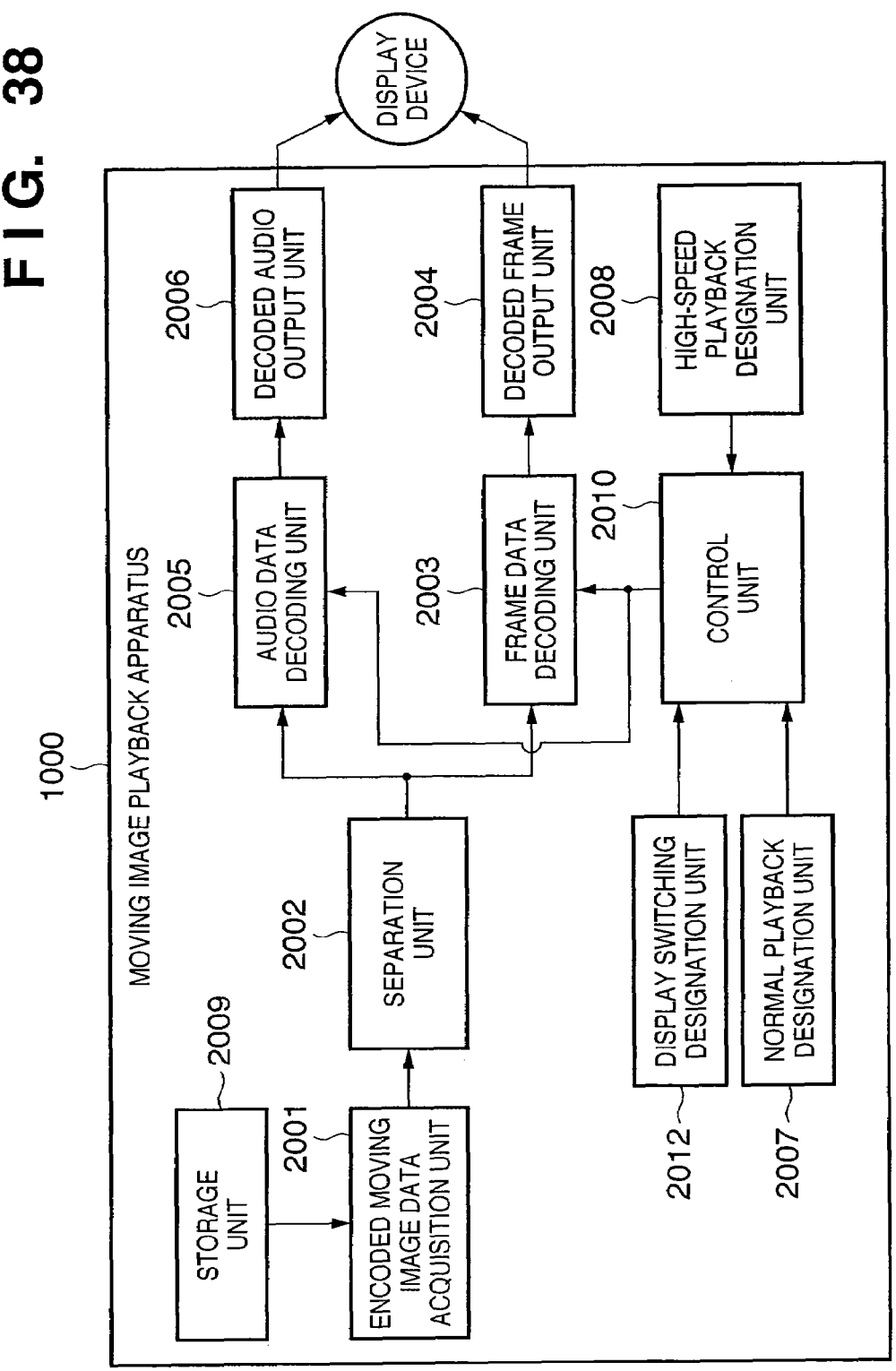
FIG. 38 is a block diagram of a moving image playback apparatus according to the ninth embodiment of the present invention.

FIG. 38 is a block diagram of a moving image playback apparatus according to the ninth embodiment. In FIG. 38, a display switching designation unit 2012 is added to the block diagram in FIG. 19.

When the user presses the display switching designation unit 2012 during high-speed playback of the moving image playback apparatus, the smooth and non-smooth display regions shown in FIG. 23B are switched.

As described above, according to the ninth embodiment, since the user can switch between the smooth and non-smooth display regions, even when his or her ROI falls outside the smooth display region, the user can browse his or her ROI within the smooth display region.

Other Embodiments

In the first to ninth embodiments, discrete wavelet transformation is used in sequence transformation of frame data. However, the present invention is not limited to this, and discrete cosine transformation or the like may be used in sequence transformation.

In the first to ninth embodiments, tiles and code blocks are used as decoding units. However, the present invention is not limited to such specific units. For example, data (precincts) obtained by collecting corresponding code blocks on an original image upon encoding may be used as decoding units.

Note that the present invention may be applied to either a system constituted by a plurality of devices (e.g., a host computer, interface device, reader, scanner, camera head, and the like), or to a part of an apparatus consisting of a single equipment (e.g., a copying machine, digital camera, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code. As the storage medium for storing the program code, for example, a flexible disk, hard disk, ROM, RAM, magnetic tape, nonvolatile memory card, CD-ROM, CD-R, DVD, optical disk, magneto-optical disk, MO, and the like may be used.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit. When the present invention is applied to the storage medium, that storage medium stores the program codes corresponding to the aforementioned flow charts.

When the present invention is applied to the storage medium, that storage medium stores program codes corresponding to the flowcharts mentioned previously.

As described above, according to the first to third embodiments, since a region to be decoded in a frame is set in accordance with the playback speed, the load on the decoding process remains unchanged irrespective of the playback speed, and a smooth moving image can be played back within a feasible load range.

According to the fourth to ninth embodiments, upon playing back digital moving image data at high speed, a principal part of the playback image can be played back and displayed at high speed, and the remaining part can be displayed and updated. Hence, even during high-speed playback, a change in overall moving image can be browsed.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2003-409359 filed on Dec. 8, 2003 and No. 2004-057631 filed on Mar. 2, 2004, which are hereby incorporated by reference herein.

What is claimed is:

1. A moving image playback apparatus for playing moving image data encoded in units of a pixel block representing a plurality of pixels, said apparatus comprising:
    a decoding unit configured to decode encoded pixel blocks at designated positions in the entire region of a frame of the encoded moving image data and to output image data represented by decoded pixel blocks as a playback frame of interest;
    a display output unit configured to output to a display a moving image obtained by said decoding unit;
    a setting unit configured to set a playback speed of the encoded moving image data; and
    a decoding control unit configured to (a) if the playback speed set by said setting unit is a normal playback speed, (i) determine all pixel blocks in a frame as being decoded and (ii) set positions of all pixel blocks to said decoding unit so as to decode all pixel blocks in the frame so that said display output unit outputs to the display an image of a whole frame decoded by said decoding unit as a playback frame, and (b) if the playback speed set by said setting unit is a predetermined playback speed higher than the normal speed, (i) determine a number of pixel blocks as being decoded to be fewer than a number of pixel blocks when the normal speed is set as so as to shorten a decode time per one frame and (ii) set the positions of the determined pixel blocks to said decoding unit so that said display output unit outputs to the display a partial image within the frame as a playback frame,
    wherein, when said setting unit sets the predetermined playback speed higher than the normal playback speed, said decoding control unit determines the number of pixel blocks to be decoded corresponding to the predetermined playback speed and sets the positions of the determined pixel blocks so that said decoding unit generates the partial image positioned in the center of the frame as a default.

2. The apparatus according to claim 1, wherein when the playback speed set by said setting unit is not more than the normal playback speed, said decoding control unit sets the entire region of the frame in said decoding unit, while, when the playback speed set by said setting unit is higher than the normal playback speed, said decoding control unit sets in said decoding unit a partial region having a size according to the ratio between the set playback speed and the normal playback speed.

3. The apparatus according to claim 1, further comprising:
    a region position setting unit configured to set a position of the region to be decoded, wherein when said region position setting unit sets the region position, said decoding control unit sets the set region in said decoding unit as a partial region.

4. The apparatus according to claim 3, wherein said region position setting unit comprises a region moving unit configured to move the region in accordance with a designation from a predetermined designation unit.

5. The apparatus according to claim 4, wherein said region moving unit moves the region for respective pixel block sizes.

6. The apparatus according to claim 4, wherein said region moving unit moves the region for respective code block sizes included in a pixel block.

7. The apparatus according to claim 4, wherein said region moving unit moves the region for respective pixels, and a decoding process is executed based on an uppermost bitplane at a region boundary in code blocks in a direction opposite to the moving direction of the region.

8. A method of controlling a moving image playback apparatus for playing moving image data encoded in units of a pixel block representing a plurality of pixels, said method comprising:
    a decoding step of decoding encoded pixel blocks at designated positions in the entire region of a frame of the encoded moving image data and to output image data represented by decoded pixel blocks as a playback frame of interest;
    a display output step of outputting to a display a moving image obtained in said decoding step;
    a setting step of setting a playback speed of the encoded moving image data; and a decoding control step of (a) if the playback speed set by said setting step is a normal playback speed, (i) determine all pixel blocks in a frame as being decoded and (ii) set positions of all pixel blocks for said decoding step so as to decode all pixel blocks in the frame so that said display output step outputs to the display an image of a whole frame decoded by said decoding step as a playback frame, and (b) if the playback speed set by said setting step is a predetermined playback speed higher than the normal speed, (i) determine a number of pixel blocks as being decoded to be fewer than a number of pixel blocks when the normal speed is set as so as to shorten a decode time per one frame and (ii) set the positions of determined pixel blocks for said decoding step so that said display output step outputs to the display a partial image within the frame as a playback frame, wherein, when said setting step sets the predetermined playback speed higher than the normal playback speed, said decoding control step determines the number of pixel blocks to be decoded corresponding to the predetermined playback speed and sets the positions of the determined pixel blocks so that said decoding step generates the partial image positioned in the center of the frame as a default.

9. A computer-readable storage medium storing a computer program, the computer program serving as a moving image playback apparatus for playing moving image data encoded in units of a pixel block representing a plurality of pixels, said program serving as units comprising:

a decoding unit configured to decode encoded pixel blocks at designated positions in the entire region of a frame of the encoded moving image data and to output image data represented by decoded pixel blocks as a playback frame of interest;

a display output unit configured to output to a display a moving image obtained by said decoding unit;

a setting unit configured to set a playback speed of the encoded moving image data; and a decoding control unit configured to (a) if the playback speed set by said setting unit is a normal playback speed, (i) determine all pixel blocks in a frame as being decoded and (ii) set positions of all pixel blocks to said decoding unit so as to decode all pixel blocks in the frame so that said display output unit outputs to the display an image of a whole frame decoded by said decoding unit as a playback frame, and (b) if the playback speed set by said setting unit is a predetermined playback speed higher than the normal speed, (i) determine a number of pixel blocks as being decoded to be fewer than a number of pixel blocks when the normal speed is set as so as to shorten a decode time per one frame and (ii) set the positions of the determined pixel blocks to said decoding unit so that said display output unit outputs to the display a partial image within the frame as a playback frame, wherein, when said setting unit sets the predetermined playback speed higher than the normal playback speed, said decoding control unit determines the number of pixel blocks to be decoded corresponding to the predetermined playback speed and sets the positions of the determined pixel blocks so that said decoding unit generates the partial image positioned in the center of the frame as a default.

* * * * *